US011659549B2

(12) United States Patent
Park et al.

(10) Patent No.: US 11,659,549 B2
(45) Date of Patent: May 23, 2023

(54) TIMING FOR CROSS SCHEDULING AND REFERENCE SIGNAL TRIGGERING

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/321,771

(22) Filed: May 17, 2021

(65) Prior Publication Data

US 2021/0377984 A1 Dec. 2, 2021

Related U.S. Application Data

(60) Provisional application No. 63/033,164, filed on Jun. 1, 2020.

(51) Int. Cl.
*H04W 72/12* (2023.01)
*H04W 72/04* (2023.01)
*H04W 72/1273* (2023.01)
*H04B 7/06* (2006.01)
*H04W 72/044* (2023.01)
*H04W 8/24* (2009.01)
(Continued)

(52) U.S. Cl.
CPC ...... *H04W 72/1273* (2013.01); *H04B 7/0626* (2013.01); *H04W 8/24* (2013.01); *H04W 72/046* (2013.01); *H04W 72/0453* (2013.01); *H04W 72/535* (2023.01)

(58) Field of Classification Search
CPC ......... H04W 72/1273; H04W 72/1269; H04W 72/1263; H04W 72/1257; H04W 72/12; H04W 72/1205; H04W 72/0453; H04W 72/044; H04W 72/0466; H04W 72/046; H04W 8/24; H04W 8/245; H04W 8/22; H04B 7/0626; H04B 7/0623; H04B 7/0632

See application file for complete search history.

(56) References Cited

U.S. PATENT DOCUMENTS

2018/0376498 A1* 12/2018 Bhattad ................. H04L 1/1861
2019/0159136 A1* 5/2019 MolavianJazi ......... H04L 5/001
(Continued)

OTHER PUBLICATIONS

International Search Report and Written Opinion—PCT/US2021/032884—ISA/EPO—dated Oct. 4, 2021.

*Primary Examiner* — Phong La
(74) *Attorney, Agent, or Firm* — Holland & Hart LLP

(57) ABSTRACT

Methods, systems, and devices for wireless communications are described. A user equipment (UE) may receive a downlink control message that schedules a downlink signal on a second carrier for the UE. The UE may determine a transmission scheme of a plurality of transmission schemes based at least in part on the first carrier, the second carrier, and a second transmission reception point scheduled for transmission of the downlink signal. The UE may determine a delay between the downlink control message and the downlink signal based at least in part on the transmission scheme and receive the downlink signal via the second carrier in accordance with the determined delay.

24 Claims, 23 Drawing Sheets

(51) Int. Cl.
*H04W 72/0453* (2023.01)
*H04W 72/50* (2023.01)

(56) References Cited

U.S. PATENT DOCUMENTS

| | | |
|---|---|---|
| 2019/0207737 A1 | 7/2019 | Babaei et al. |
| 2020/0053755 A1* | 2/2020 | Ang ................... H04W 72/0453 |
| 2020/0053757 A1* | 2/2020 | Bagheri ................ H04L 5/0035 |
| 2020/0229104 A1* | 7/2020 | MolavianJazi ....... H04W 52/54 |
| 2020/0305168 A1* | 9/2020 | Liou ................. H04W 72/0493 |
| 2021/0377984 A1* | 12/2021 | Park ........................ H04W 8/24 |

* cited by examiner

TIMING FOR CROSS SCHEDULING AND REFERENCE SIGNAL TRIGGERING

CROSS REFERENCE

The present application for patent claims the benefit of U.S. Provisional Patent Application No. 63/033,164 by PARK et al., entitled "TIMING FOR CROSS SCHEDULING AND REFERENCE SIGNAL TRIGGERING," filed Jun. 1, 2020, assigned to the assignee hereof, and expressly incorporated by reference herein.

FIELD OF TECHNOLOGY

The following relates generally to wireless communications and more specifically to timing for cross scheduling and reference signal triggering.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may communicate with one or more transmission-reception points (TRPs) (e.g., in a single-TRP configuration or multi-TRP configuration). The TRPs may transmit downlink transmissions to the UE according to a beam configuration and the UE may decode the downlink transmissions in accordance with the beam configurations. The timing for processing downlink transmissions at the UE may vary depending on whether a single TRP or multiple TRPs are configured for communications.

SUMMARY

Some wireless communications systems may support various transmission schemes such as cross-carrier scheduling or same carrier scheduling for downlink transmissions, which may be scheduled for a single transmission reception point (TRP) or multiple TRPs (multi-TRP). Further, in a multi-TRP scenario, the transmission scheme may indicate a multiplexing scheme such as time division multiplexing (TDM), code division multiplexing (CDM), or space division multiplexing (SDM).

In some cases, a delay between a downlink grant scheduling a data channel or a downlink reference signal may depend on the transmission scheme or subcarrier spacing (SCS). For instance, the delay may be a function of the SCS of the physical downlink control channel (PDCCH) containing the downlink grant that schedules a physical downlink shared channel (PDSCH) or an aperiodic channel state information reference signal (A-CSI-RS). The delay may be associated with one or both of a scheduling delay (A) or a beam switch delay (d), each of which, or the combination, may be based on the transmission scheme. In some cases, the values for $\Delta$ and d may be determined by the UE and reported to the base station as in a UE capability report. The base station and the UE may determine the value A and d based on the transmission scheme and the UE capability report may include an indication of the delay in the PDCCH.

A method of wireless communications at a UE is described. The method may include receiving, from a first TRP and via a first carrier configured for the UE, a downlink control message that schedules a downlink signal on a second carrier for the UE. The method may include determining a transmission scheme of a set of transmission schemes based on the first carrier, the second carrier, and a second TRP scheduled for transmission of the downlink signal. The method may further include determining a delay between the downlink control message and the downlink signal based on the transmission scheme and receiving the downlink signal via the second carrier in accordance with the determined delay.

An apparatus for wireless communications at a UE is described. The apparatus may include a processor, memory coupled with the processor, and instructions stored in the memory. The instructions may be executable by the processor to cause the apparatus to receive, from a first TRP and via a first carrier configured for the UE, a downlink control message that schedules a downlink signal on a second carrier for the UE. The instructions may also be executable by the processor to determine a transmission scheme of a set of transmission schemes based on the first carrier, the second carrier, and a second TRP scheduled for transmission of the downlink signal and determine a delay between the downlink control message and the downlink signal based on the transmission scheme. The instructions may be further executable by the processor to cause the apparatus to receive the downlink signal via the second carrier in accordance with the determined delay.

Another apparatus for wireless communications at a UE is described. The apparatus may include means for receiving, from a first TRP and via a first carrier configured for the UE, a downlink control message that schedules a downlink signal on a second carrier for the UE and means for determining a transmission scheme of a set of transmission schemes based on the first carrier, the second carrier, and a second TRP scheduled for transmission of the downlink signal. The apparatus may also include means for determining a delay between the downlink control message and the downlink signal based on the transmission scheme and means for receiving the downlink signal via the second carrier in accordance with the determined delay.

A non-transitory computer-readable medium storing code for wireless communications at a UE is described. The code may include instructions executable by a processor to receive, from a first TRP and via a first carrier configured for the UE, a downlink control message that schedules a downlink signal on a second carrier for the UE and determine a transmission scheme of a set of transmission schemes based on the first carrier, the second carrier, and a second TRP scheduled for transmission of the downlink signal. The code may further include instructions executable by the processor to determine a delay between the downlink control message and the downlink signal based on the transmission scheme and receive the downlink signal via the second carrier in accordance with the determined delay.

In some examples of the method, apparatuses, and non-transitory computer-readable medium described herein, determining the delay may include operations, features, means, or instructions for determining a first value for the delay based on the first and second TRPs being the same, and determining a second value for the delay based on the first and second TRPs being different.

Some examples of the method, apparatuses, and non-transitory computer-readable medium described herein may further include operations, features, means, or instructions for determining the second value based on a multiplexing scheme associated with the multiple TRP scheme.

In some examples of the method, apparatuses, and non-transitory computer-readable medium described herein, determining the delay may include operations, features, means, or instructions for determining a first value for the delay based on the first and second carriers being the same, and determining a second value for the delay based on the first and second carriers being different.

In some examples of the method, apparatuses, and non-transitory computer-readable medium described herein, determining the delay may include operations, features, means, or instructions for determining a third value for the delay based on the first and second TRPs being the same, and determining a fourth value for the delay based on the first and second TRPs being different.

In some examples of the method, apparatuses, and non-transitory computer-readable medium described herein, determining the delay may include operations, features, means, or instructions for determining a beam switching timing corresponding to a number of symbols for switching from a first beam associated with the first carrier to a second beam associated with the second carrier, and determining an additional timing based on the transmission scheme.

Some examples of the method, apparatuses, and non-transitory computer-readable medium described herein may further include operations, features, means, or instructions for transmitting a capability report to the first TRP indicating one or more delay values for the UE, where each of the one or more delay values corresponds to a different transmission scheme of the set of transmission schemes.

In some examples of the method, apparatuses, and non-transitory computer-readable medium described herein, determining the delay may include operations, features, means, or instructions for determining the delay to be a value of the one or more delay values indicated in the capability report.

In some examples of the method, apparatuses, and non-transitory computer-readable medium described herein, receiving the downlink control message may include operations, features, means, or instructions for receiving an indication of a value of the one or more delay values in the downlink control message based on the capability report.

In some examples of the method, apparatuses, and non-transitory computer-readable medium described herein, determining the delay may include operations, features, means, or instructions for determining the delay based on an SCS associated with the first carrier used for receiving the downlink control message.

In some examples of the method, apparatuses, and non-transitory computer-readable medium described herein, the delay includes a scheduling delay or a beam switching timing and corresponds to a number of symbols between an end symbol of the downlink control message and a start symbol of the downlink signal.

In some examples of the method, apparatuses, and non-transitory computer-readable medium described herein, the downlink signal includes one of a downlink shared channel or a CSI-RS.

A method of wireless communications at a first TRP is described. The method may include identifying a downlink signal for scheduling for a UE and determining a transmission scheme of a set of transmission schemes for the downlink signal based on a first carrier of a downlink control message that schedules the downlink signal, a second carrier for transmission of the downlink signal, and a second TRP used for transmission of the downlink signal. The method may further include determining a delay between the downlink control message and the downlink signal based on the transmission scheme and transmitting, to a UE and via the first carrier, the downlink control message that schedules the downlink signal on the second carrier for the UE according to the determined delay.

An apparatus for wireless communications at a first TRP is described. The apparatus may include a processor, memory coupled with the processor, and instructions stored in the memory. The instructions may be executable by the processor to cause the apparatus to identify a downlink signal for scheduling for a UE and determine a transmission scheme of a set of transmission schemes for the downlink signal based on a first carrier of a downlink control message that schedules the downlink signal, a second carrier for transmission of the downlink signal, and a second TRP used for transmission of the downlink signal. The instructions may be further executable by the processor to cause the apparatus to determine a delay between the downlink control message and the downlink signal based on the transmission scheme and transmit, to a UE and via the first carrier, the downlink control message that schedules the downlink signal on the second carrier for the UE according to the determined delay.

Another apparatus for wireless communications at a first TRP is described. The apparatus may include means for identifying a downlink signal for scheduling for a UE and means for determining a transmission scheme of a set of transmission schemes for the downlink signal based on a first carrier of a downlink control message that schedules the downlink signal, a second carrier for transmission of the downlink signal, and a second TRP used for transmission of the downlink signal. The apparatus may include means for determining a delay between the downlink control message and the downlink signal based on the transmission scheme, and means for transmitting, to a UE and via the first carrier, the downlink control message that schedules the downlink signal on the second carrier for the UE according to the determined delay.

A non-transitory computer-readable medium storing code for wireless communications at a first TRP is described. The code may include instructions executable by a processor to identify a downlink signal for scheduling for a UE and determine a transmission scheme of a set of transmission schemes for the downlink signal based on a first carrier of a downlink control message that schedules the downlink signal, a second carrier for transmission of the downlink signal, and a second TRP used for transmission of the downlink signal. The code may further include instructions executable by the processor to determine a delay between the downlink control message and the downlink signal based on the transmission scheme and transmit, to a UE and via the first carrier, the downlink control message that schedules the downlink signal on the second carrier for the UE according to the determined delay.

In some examples of the method, apparatuses, and non-transitory computer-readable medium described herein, determining the delay may include operations, features, means, or instructions for determining a first value for the delay based on the first and second TRPs being the same, and determining a second value for the delay based on the first and second TRPs being different.

In some examples of the method, apparatuses, and non-transitory computer-readable medium described herein, the transmission scheme may be a multiple TRP scheme associated with the first TRP and the second TRP, where determining the delay further may include operations, features, means, or instructions for determining the second value based on a multiplexing scheme associated with the multiple TRP scheme.

In some examples of the method, apparatuses, and non-transitory computer-readable medium described herein, determining the delay may include operations, features, means, or instructions for determining a first value for the delay based on the first and second carriers being the same, and determining a second value for the delay based on the first and second carriers being different.

In some examples of the method, apparatuses, and non-transitory computer-readable medium described herein, determining the delay may include operations, features, means, or instructions for determining a third value for the delay based on the first and second TRPs being the same, and determining a fourth value for the delay based on the first and second TRPs being different.

In some examples of the method, apparatuses, and non-transitory computer-readable medium described herein, determining the delay may include operations, features, means, or instructions for determining a beam switching timing corresponding to a number of symbols for switching from a first beam associated with the first carrier to a second beam associated with the second carrier, and determining an additional timing based on the transmission scheme.

Some examples of the method, apparatuses, and non-transitory computer-readable medium described herein may further include operations, features, means, or instructions for receiving a capability report from the UE indicating one or more delay values for the UE, where each of the one or more delay values corresponds to a different transmission scheme of the set of transmission schemes.

In some examples of the method, apparatuses, and non-transitory computer-readable medium described herein, determining the delay may include operations, features, means, or instructions for determining the delay to be a value of the one or more delay values indicated in the capability report.

Some examples of the method, apparatuses, and non-transitory computer-readable medium described herein may further include operations, features, means, or instructions for transmitting an indication of a value of the one or more delay values in the downlink control message based on the capability report.

In some examples of the method, apparatuses, and non-transitory computer-readable medium described herein, determining the delay may include operations, features, means, or instructions for determining the delay based on an SCS associated with the first carrier used for receiving the downlink control message.

In some examples of the method, apparatuses, and non-transitory computer-readable medium described herein, the delay includes a scheduling delay or a beam switching timing and corresponds to a number of symbols between an end symbol of the downlink control message and a start symbol of the downlink signal.

In some examples of the method, apparatuses, and non-transitory computer-readable medium described herein, the downlink signal includes one of a downlink shared channel or a CSI-RS.

DETAILED DESCRIPTION

Figure 1:
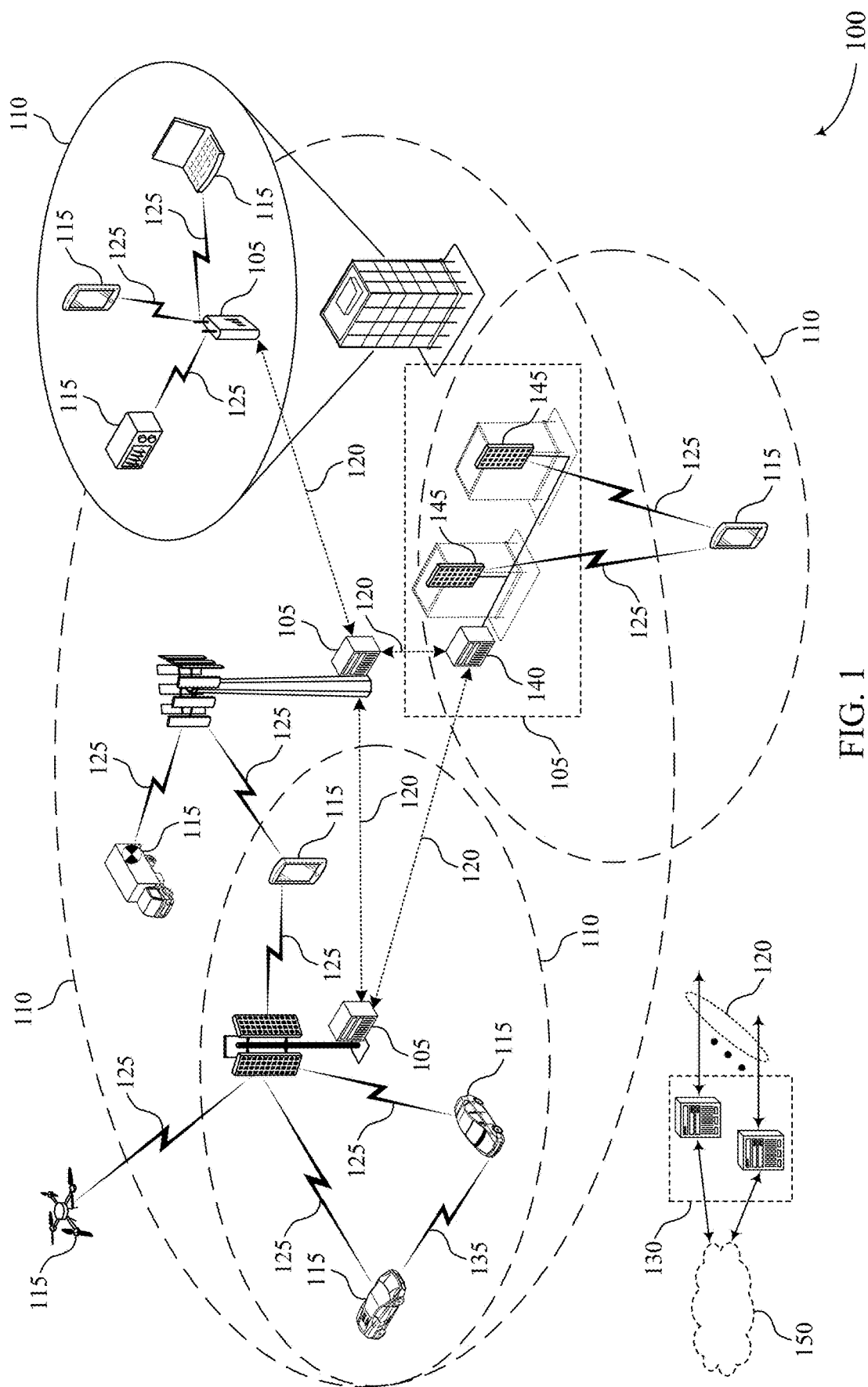
FIG. 1 illustrates an example of a wireless communications system that supports timing for cross scheduling and reference signal triggering in accordance with aspects of the present disclosure.

Some wireless communications systems (e.g., a new radio (NR) system) may support cross-carrier scheduling. In such examples, a base station may transmit a downlink grant to a user equipment (UE) on a first component carrier (CC) (e.g., a scheduling CC). The downlink grant may be included in a physical downlink control channel (PDCCH) on the scheduling CC. The downlink grant may indicate a set of physical downlink shared channel (PDSCH) resources for receiving a data transmission on a scheduled CC (e.g., a second CC that is different from the first CC). Additionally, or alternatively, the downlink grant may also indicate a set of aperiodic channel state information reference signal (A-CSI-RS) resources to estimate the channel and report channel quality information.

In some examples, the UE may process the PDCCH that includes the downlink grant, and the processing may take some amount of time (e.g., a processing delay) depending on capabilities of the UE or other communication parameters. In some cases, the scheduling CC may have a different numerology than the scheduled CC. For instance, the scheduling CC may have a different subcarrier spacing (SCS) than the scheduled CC, or the scheduling CC may have different transmission time intervals (TTIs) than the scheduled CC, or both. The processing delay, the different SCS, or the different TTIs, or any combination thereof, may result in reduced throughput on the scheduled CC, or unnecessary power expenditures and overhead at the UE because of additional buffering processing or timing. For example, if some of the PDSCH symbols on the scheduled CC are not scheduled (e.g., the downlink grant indicates causal PDSCH or A-CSI-RS symbols on the scheduled CC that are subsequent to the PDCCH and the processing delay) then the non-causal symbols (symbols that are concurrent with one or more of the PDCCH symbols or the processing delay) on the scheduled CC may be wasted, which may be an inefficient use of resources. Alternatively, if the downlink grant indicates both causal and non-causal PDSCH or A-CSI-RS symbols on the scheduled CC, the UE may meet increased buffering processing or timing because in order to receive data on each non-causal PDSCH or A-CSI-RS symbol, the UE may be constantly buffering during the non-causal PDSCH or A-CSI-RS symbols.

To improve throughput, a scheduling/triggering delay ($\Delta$) (e.g., a slot delay threshold, a minimum scheduling delay, etc.) may be implemented for cross-carrier scheduling. The $\Delta$ may define a threshold number of slots (e.g., a minimum number) between a slot carrying the PDCCH that schedules a data transmission and a slot carrying the scheduled data transmission (e.g., PDSCH) or A-CSI-RS. By receiving the data transmission in a slot that satisfies the $\Delta$, the UE may avoid non-causal symbol processing. That is, the UE may receive the data transmission in a slot subsequent to the slot in which the PDCCH is received, and thus without any buffering targets. In such cases, the system may also utilize each PDSCH symbol in a given slot. A UE may identify the slot delay by receiving a configuration message indicating the $\Delta$. In some examples, the UE may identify the slot delay by receiving a slot delay parameter. The slot delay parameter may be, for example, a timing offset equal to a number of slots, which may or may not satisfy the minimum scheduling delay.

In some cases, a beam switching timing threshold may be implemented for cross carrier scheduling. The beam switching timing threshold may be the minimum number of Orthogonal Frequency Division Multiplexing (OFDM) symbols for the UE to switch beams between PDCCH reception and PDSCH or A-CSI-RS transmission. The beam switching timing threshold may be included in the UE capability report. The beam switching timing threshold may be the timeDurationForQCL for PDSCH or beamSwitchTiming for A-CSI-RS. The beam switching timing may be defined in units of PDSCH or A-CSI-RS symbols.

If the PDCCH SCS is less than the PDSCH SCS or the A-CSI-RS SCS, an additional beam switching timing threshold (d) may be added to the timeDurationForQCL or beamSwitchTiming for cross-carrier scheduling or triggering. The same value for d may be used for both PDSCH scheduling and A-CSI-RS triggering. The d may be defined in units of PDCCH symbols.

In some cases, values for $\Delta$ and d may be a function of the SCS of the PDCCH. The values for $\Delta$ and d may be included as an entry in one or more tables as a function of PDCCH SCS. The base station may explicitly indicate the values of $\Delta$ and d as an entry in a table. In some examples, instead of receiving an explicit indication of the $\Delta$, the UE may be preconfigured with the $\Delta$ values based on one or more values preconfigured or defined in accordance with a standard. Such a pre-configurations may include rule-based or table-based values. In some examples, a UE and a base station may alternate between a cross-carrier mode and a self-scheduling mode or may operate in a mode where multiple scheduling carriers can schedule on the scheduled carrier.

In some cases, a UE may use a single-TRP communication scheme or a multi-TRP communication scheme. When a UE uses a multi-TRP scheme, the UE may take more time for cross-carrier scheduling of a PDSCH or A-CSI-RS triggering than if the device uses a single-TRP scheme. The $\Delta$ and d values used for single-TRP communication schemes may not support multi-TRP communication schemes.

In some examples, different values for the A and d parameters for cross-carrier scheduling and triggering may be used depending on whether a UE will use a single-TRP, a multi-TRP, or a Single Frequency Network (SFN) communication scheme. Different values for the A and d for same-carrier scheduling and triggering may be used depending on whether a UE will use a single-TRP, a multi-TRP, or an SFN communication scheme.

Further, different values for $\Delta$ and d may be used depending on the use of a single-TRP, a multi-TRP, or an SFN communication scheme and cross-carrier scheduling/triggering or same-carrier scheduling/triggering. Different values for $\Delta$ and d may be used depending on the specific multi-TRP communication scheme. The specific multi-TRP communication scheme may include but are not limited to time division multiplexing (TDM), frequency division multiplexing (FDM), and space division multiplexing (SDM).

In some examples, the values for the A and d parameters may be pre-configured depending on the possible choices of transmission scheme. In some examples, the values for $\Delta$ and d may be pre-configured in a specification depending on the possible choices of transmission scheme. The base station and the UE may determine a proper value for $\Delta$ and d based on the transmission scheme and the specification.

The defined set of values for the Δ and d may include values specific for each possible transmission scheme. The possible transmission schemes may include but are not limited to combinations of single carrier scheduling/triggering or cross-carrier scheduling/triggering and a single-TRP, a multi-TRP-TDM, a multi-TRP/FDM, a multi-TRP-SDM, or an SFN communication scheme. Further, the values for the A and d may be determined by the UE and reported to the base station as in a UE capability report. The base station and the UE may determine the value A and d based on the transmission scheme and the UE capability report.

Aspects of the disclosure are initially described in the context of wireless communications systems. Aspects of the disclosure are further described with reference to data transmission schemes and process flow diagrams. Aspects of the disclosure are further illustrated by and described with reference to apparatus diagrams, system diagrams, and flowcharts that relate to timing for cross scheduling and reference signal triggering.

FIG. 1 illustrates an example of a wireless communications system 100 that supports timing for cross scheduling and reference signal triggering in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include an SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications system 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, different values for the minimum scheduling/triggering delay and additional beam switching timing thresholds for cross-carrier scheduling and A-CSI-RS triggering may be used depending on whether a UE uses a single-TRP communication scheme or a multi-TRP communication scheme. In some additional examples, different values for the minimum scheduling/triggering delay and beam switching timing thresholds may be used depending on whether single-TRP or multi-TRP is used for same-carrier scheduling and A-CSI-RS triggering. In some cases, different values for the minimum scheduling/triggering delay and beam switching timing thresholds for cross-carrier scheduling and A-CSI-RS triggering may be used depending on specific multi-TRP schemes, which may include time division multiplexing, frequency division multiplexing, frequency division multiplexing, or single frequency network.

Figure 2:
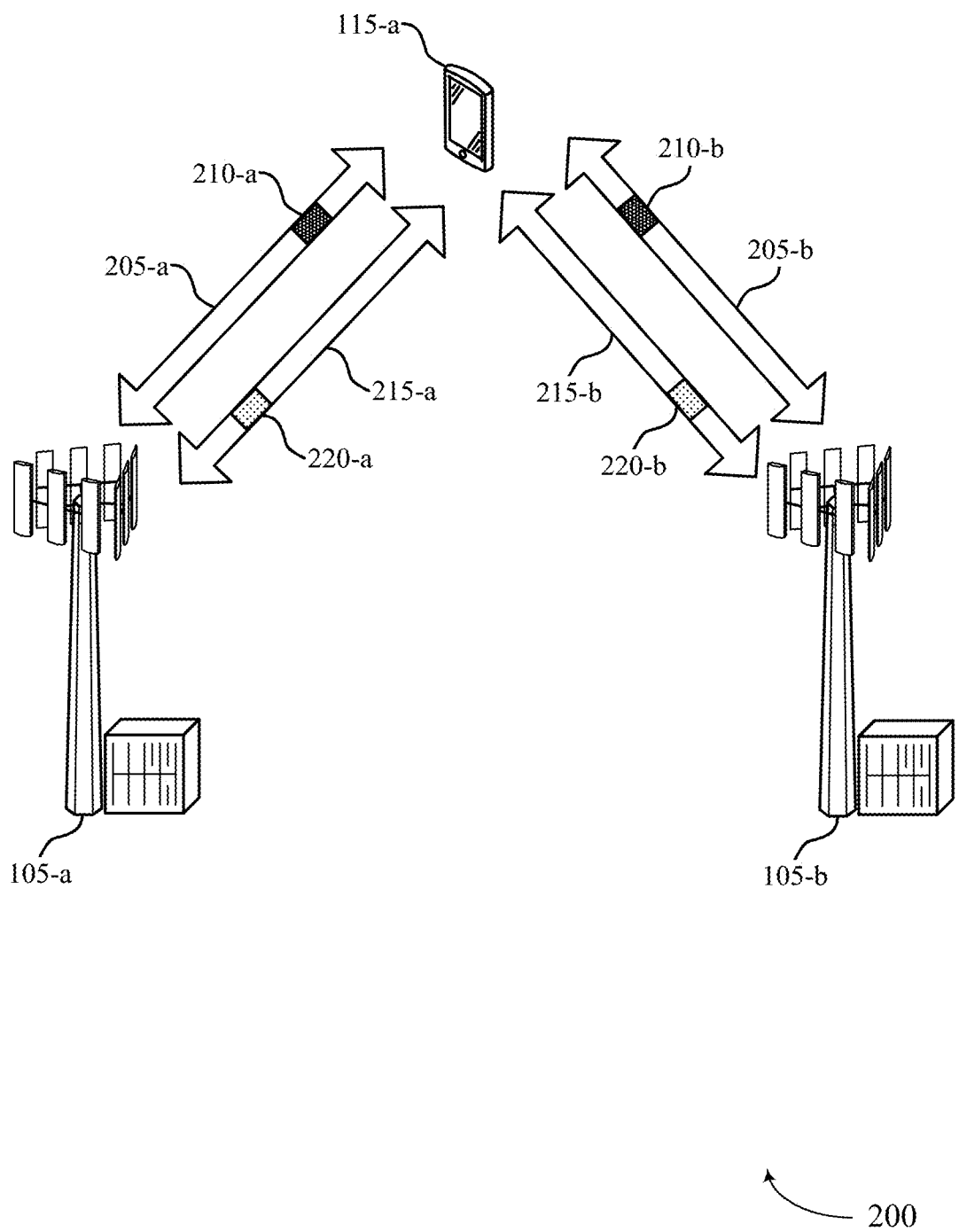
FIG. 2 illustrates an example of a wireless communications system that supports timing for cross scheduling and reference signal triggering in accordance with aspects of the present disclosure.

FIG. 2 illustrates an example of a wireless communications system 200 that supports timing for cross scheduling and reference signal triggering in accordance with aspects of the present disclosure. In some examples, wireless communications system 200 may implement aspects of wireless communications system 100. Wireless communications system 200 may include a first base station 105-*a* (e.g., a first TRP), a second base station 105-*b* (e.g., a second TRP), and a UE 115-*a*, which may be examples of corresponding base stations 105 and UEs 115, respectively, as described herein with reference to FIG. 1. In some cases, base station 105-*a* and base station 105-*b* may be two TRPs associated with a same base station 105, or different panels of a same base station 105, or different beams associated with a same base station 105, etc. Accordingly, UE 115-*a* may support communicating with both base station 105-*a* and base station 105-*b* simultaneously.

In some examples, base station 105-*a*, base station 105-*b*, and UE 115-*a* may support cross-carrier scheduling. UE 115-*a* may receive, from base station 105-*a*, downlink grant 210-*a* and scheduling/triggering for a data transmission 220-*a* across different CCs. In such examples, base station 105-*a* may transmit a downlink grant 210-*a* on a scheduling CC 205-*a*. The downlink grant 210-*a* may be included in a PDCCH on scheduling CC 205-*a*. The downlink grant may indicate a set of PDSCH resources for receiving or transmitting a first data transmission 220-*a* on a scheduled CC 215-*a*.

UE 115-*a* may process the PDCCH that includes downlink grant 210-*a*, and the processing may take a minimum amount of time (e.g., a processing delay). In some cases, scheduling CC 205-*a* may have a different SCS than scheduled CC 215-*a*. The processing delay, the different SCS, or the different TTIs, or any combination thereof, may result in additional buffering time requirements. The scheduling of the first data transmission 220-*a* may be delayed a number of symbols after the downlink grant to accommodate the buffering time requirements. This delay may be A.

In some examples, UE 115-*a* may communicate with a single base station 105, such as base station 105-*a*. This may be referred to as a single-TRP scheme. In some other examples, UE 115-*a* may be communicating with multiple base stations 105, such as base station 105-*a* and base station 105-*b*. This may be referred to as a multi-TRP scheme.

As shown, UE 115-*a* may receive a first downlink grant 210-*a* from base station 105-*a* that schedules a first data transmission 220-*a* from base station 105-*a*. UE 115-*a* may also receive a second downlink grant 210-*b* transmitted from base station 105-*b* that schedules a second data transmission 220-*b* with base station 105-*b*. In another example, UE 115-*a* may receive a first downlink grant 210-*a* transmitted from base station 105-*a* that schedules the data transmission 220-*b* with base station 105-*b*.

In some examples, UE 115-*a* may take additional buffering time when operating in a multi-TRP scheme than when operating in a single-TRP scheme. The data transmission 220-*a* may be scheduled with a different value for Δ based on the transmission scheme defined in the PDCCH that includes the downlink grant 210-*a*. The value of A may depend on if the data transmission 220-*a* is configured for cross-carrier scheduling/triggering or same-carrier scheduling/triggering. The value of A may also depend on if the UE 115-*a* is operating in a multi-TRP scheme.

The data transmission 220-*a* may also be scheduled with a beam switching timing threshold between the PDCCH containing the downlink grant 210-*a* and the data transmission 220-*a*. The beam switching timing threshold may be based on the UE 115-*a* specific capabilities and may be the minimum number of OFDM symbols required by the UE 115-*a* to switch beams between PDCCH reception and PDSCH or A-CSI-RS reception or transmission. UE 115-*a* may communicate the beam switching timing threshold to base station 105-*a* and base station 105-*b* in the UE capability report.

If the SCS of the scheduling CC 205-*a* is less than the SCS of the scheduled CC 215-*a*, then an additional delay d may be added to the beam switching timing threshold for cross-carrier scheduling/triggering with different SCS.

In some examples, UE 115-*a* may take additional time to switch beams between downlink grant 210-*a* reception and the data transmission 220-*a* when operating in a multi-TRP scheme than when operating in a single-TRP scheme. To compensate for the additional beam switching time in the multi-TRP scheme, a different value of d may be used for different transmission schemes and scheduling schemes. The value d may depend on if the data transmission 220-*a* is configured for cross-carrier scheduling/triggering or same-carrier scheduling/triggering. The value of d may also depend on if the UE 115-*a* is operating in a multi-TRP scheme.

The values for Δ and d may also depend on the specific configured multi-TRP scheme such as TDM, FDM, and SDM. The values for Δ and d may also depend on if a SFN scheme is configured.

In some examples, base station 105-*a*, base station 105-*b*, and UE 115-*a* may determine the value of A and d from specified values, in a specification, based on the transmission and scheduling scheme. Base station 105-*a*, base station 105-*b*, and UE 115-*a* may be pre-configured to select values for Δ and d from specified tables based on the scheduling scheme (e.g., cross-carrier scheduling or same-carrier scheduling) and the transmission scheme (single-TRP scheme or multi-TRP scheme). Base station 105-*a*, base station 105-*b*, and UE 115-*a* may determine the value of A and d based on the configured transmission scheme and the specification.

In some examples, UE 115-*a* may report the values of A and d in a UE capability report depending on the possible choices of transmission schemes. Base station 105-*a*, base station 105-*b*, and UE 115-*a* may determine the value of A and d based on the configured transmission scheme and the UE capability report.

Figure 3A:
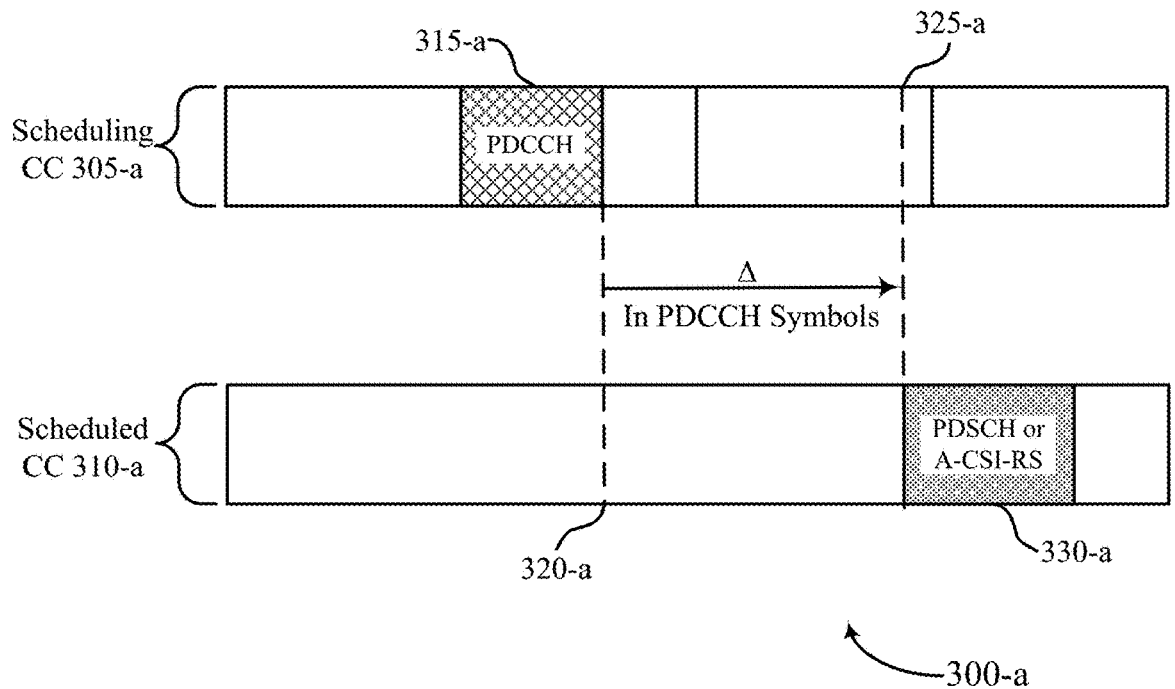
FIGS. 3A & 3B illustrate two examples of data transmission schemes that support timing for cross scheduling and reference signal triggering in accordance with aspects of the present disclosure.
Figure 3B:
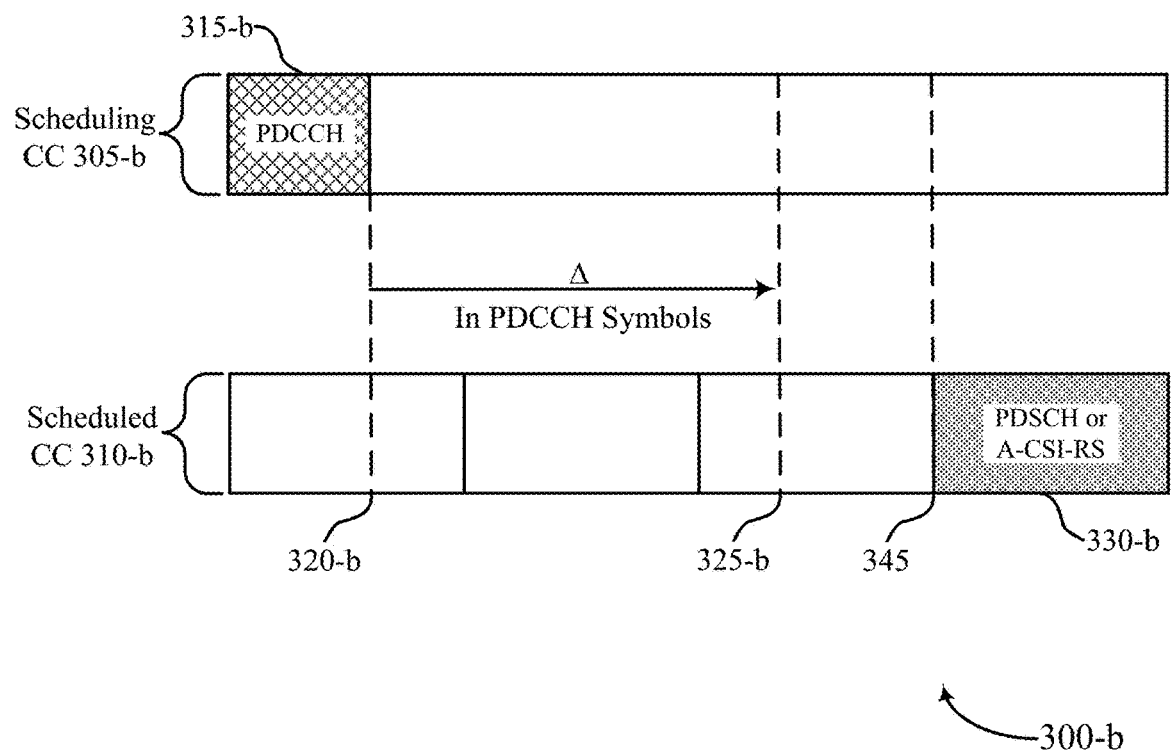

FIGS. 3A and 3B illustrate examples of data transmission schemes 300-*a* and 300-*b* that support timing for cross scheduling and reference signal triggering in accordance with aspects of the present disclosure. In some examples, data transmission schemes 300-*a* and 300-*b* may implement aspects of wireless communications system 100 or wireless communications system 200. A UE 115 and a base station 105 may use data transmission schemes 300-*a* and 300-*b* for cross carrier scheduling. In some cases, a base station 105 may transmit a PDCCH 315-*a* which may contain a downlink grant, which may be an example of downlink grant 210-*a* and downlink grant 210-*b* from communications system 200. PDCCH 315-*a* may schedule a data transmission 330-*a* which may be an example of the data transmission 220 from communications system 200.

FIG. 3A illustrates an example of scheduling a data transmission using cross-carrier scheduling where the sub-carrier spacing of the scheduling CC 305-*a* is greater than the sub-carrier spacing of the scheduled CC 310-*a*. In this example, the PDCCH 315-*a* ends at a first time 320-*a*. The Δ begins at first time 320-*a* and proceeds for a specified or determined number of symbols. The Δ ends at a second time 325-*a*. The data transmission 330-*a* may not start until the number of symbols defined by A pass. The data transmission 330-*a* may begin at second time 325-*a*.

FIG. 3B illustrates an example of scheduling a data transmission using cross-carrier scheduling where the subcarrier spacing of the scheduling CC 305-b is less than the sub-carrier spacing of the scheduled CC 310-b. In this example, the PDCCH 315-b ends at first time 320-b. The Δ begins at first time 320-b and proceeds for a specified or determined number of symbols. The Δ ends at a second time 325-b. The data transmission 330-b may not start earlier than the first symbol of the slot that starts after the Δ expires. The data transmission 330-b may begin at second time 325-b.

The length of Δ may be defined as $N_{PDSCH}$ for PDSCH scheduling of $N_{CSIRS}$ for A-CSI-RS scheduling. The value of $N_{PDSCH}$ and $N_{CSIRS}$ may be a function of the SCS of the PDCCH. For example, $N_{PDSCH}$ and $N_{CSIRS}$ may relate to the SCS of the PDCCH as shown in Table 1 below:

TABLE 1

| PDCCH SCS | $N_{PDSCH}$ or $N_{CSIRS}$ (in PDCCH symbols) |
|---|---|
| 15 kHz | 4 |
| 30 kHz | 8 |
| 60 kHz | 10 |
| 120 kHz | 14 |

The length of Δ may also be a function of the scheduling scheme and the transmission scheme. For example, there may be a specified value of Δ for all combinations of possible PDCCH SCS, scheduling schemes (e.g., cross carrier and same carrier), and transmission scheme (single-TRP, multi-TRP/TDM, multi-TRP/FDM, multi-TRP/SDM or SFN).

Figure 4:
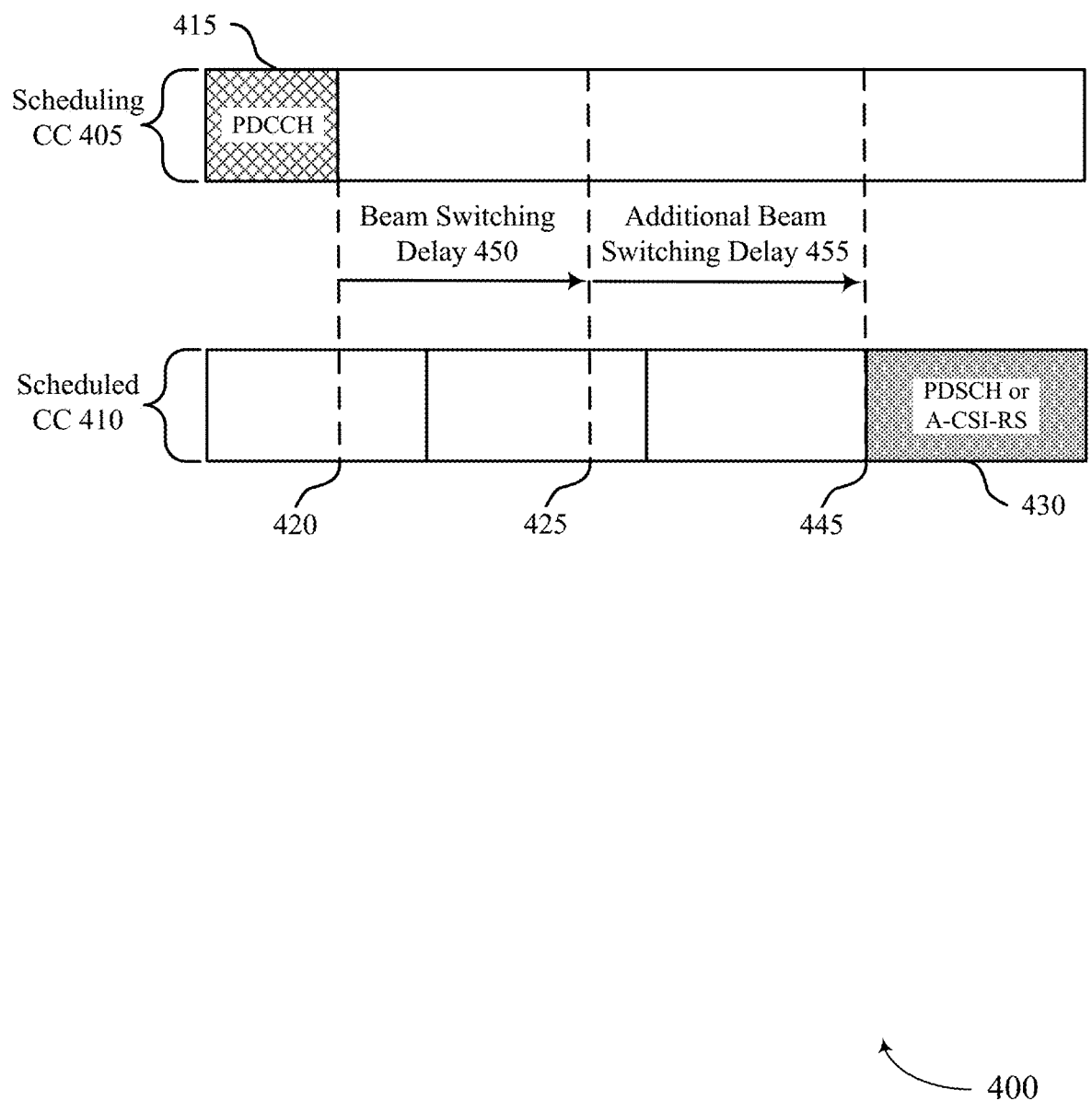
FIG. 4 illustrates an example of a data transmission scheme that supports timing for cross scheduling and reference signal triggering in accordance with aspects of the present disclosure.

FIG. 4 illustrates an example of a data transmission scheme 400 that supports timing for cross scheduling and reference signal triggering in accordance with aspects of the present disclosure. In some examples, data transmission scheme 400 may implement aspects of wireless communications system 100. A UE 115 and a base station 105 may use data transmission scheme 400 for cross-carrier scheduling. In some cases, a base station 105 may transmit a PDCCH 415-a which may contain a downlink grant, which may be an example of downlink grant 210-a and downlink grant 210-b from communications system 200. PDCCH 415-a may schedule a data transmission 430-a which may be an example of the data transmission 220 from communications system 200.

In data transmission scheme 400, PDCCH 415 ends at a first time 420. Beam switching delay 450 begins at first time 420. The duration of the beam switching delay is defined as timeDurationForQCL for PDSCH or beamSwitchTiming for A-CSI-RS, with units of PDSCH or A-CSI-RS symbols. The beam switching delay ends at a second time 425. If the SCS of the scheduling CC 405 is greater than the SCS of the scheduled CC 410, then data transmission 430 may begin after second time 425. If the SCS of the scheduling CC 405 is less than the SCS of the scheduled CC 410, then an additional delay d is added to the beam switching delay.

The value of the additional delay d may be a function of transmission parameters. The value of the additional delay d may be a function of PDCCH SCS. For example, the additional delay d may relate to PDCCH SCS as shown in Table 1 below:

TABLE 2

| PDCCH SCS | d (in PDCCH Symbols) |
|---|---|
| 15 kHz | 8 |
| 30 kHz | 8 |
| 60 kHz | 14 |

The length of d may also be a function of the scheduling scheme and the transmission scheme. For example, there may be a specified value of d for all combinations of possible PDCCH SCS, scheduling schemes (e.g., cross carrier and same carrier), and transmission scheme (single-TRP, multi-TRP/TDM, multi-TRP/FDM, multi-TRP/SDM, or SFN).

Figure 5:
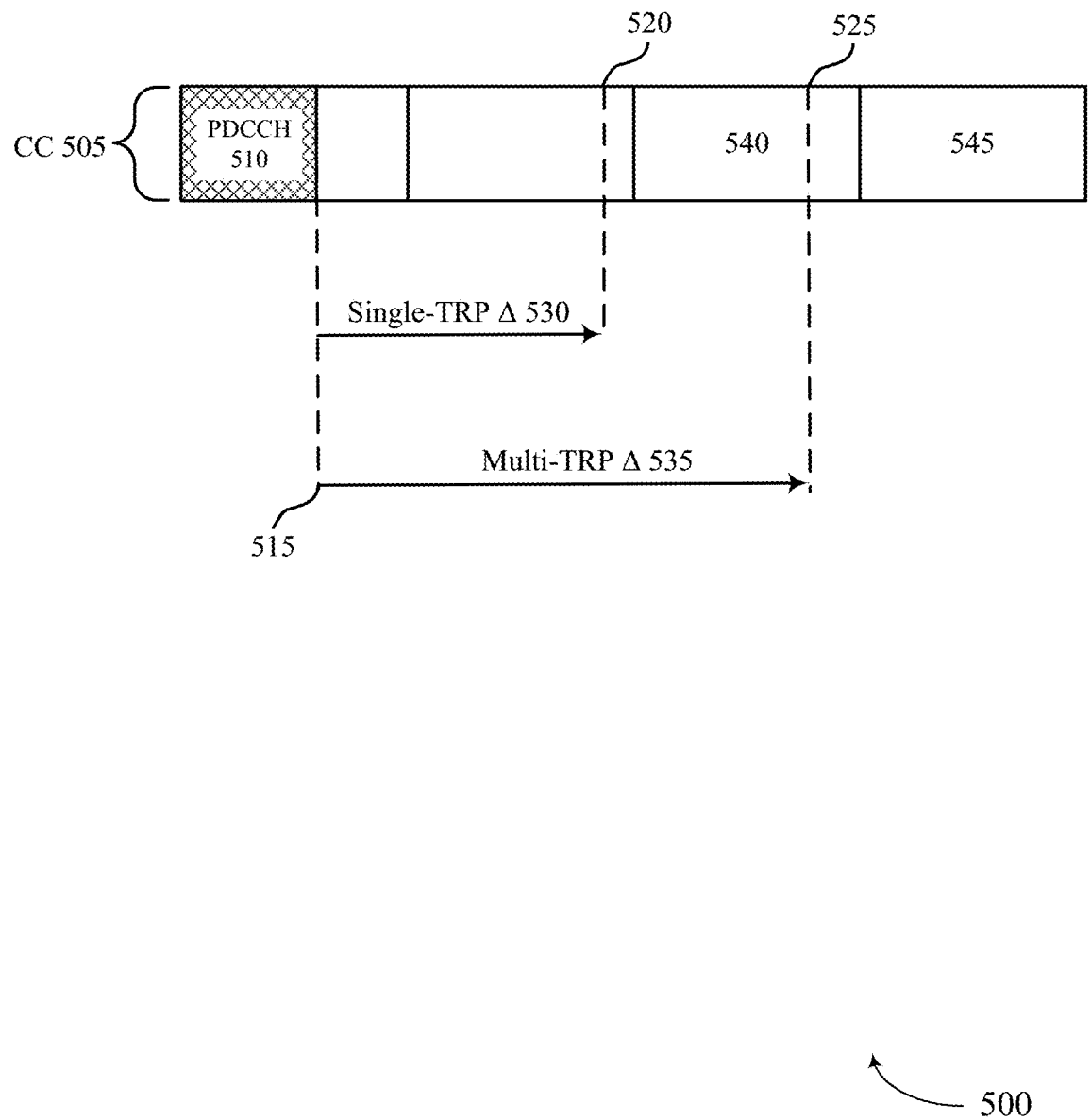
FIG. 5 illustrates an example of a data transmission scheme that supports timing for cross scheduling and reference signal triggering in accordance with aspects of the present disclosure.

FIG. 5 illustrates an example of a data transmission scheme 500 that supports timing for cross scheduling and reference signal triggering in accordance with aspects of the present disclosure. In some examples, data transmission scheme 500 may implement aspects of wireless communications system 100. A UE 115 and a base station 105 may use data transmission scheme 500 for same-carrier scheduling. In some cases, a base station 105 may transmit a PDCCH 510 which may contain a downlink grant, which may be an example of downlink grant 210-a and downlink grant 210-b from communications system 200. PDCCH 510 may schedule a data transmission which may be an example of data transmission 220-a from communications system 200.

In data transmission scheme 500, a base station 105 may transmit a PDCCH 510 to UE 115 and schedule a data transmission on a single CC 505. The base station 105 may schedule the data transmission with a different Δ depending on if the UE is using a single-TRP scheme or a multi-TRP scheme. The PDCCH 510 ends at a first time 515. At first time 515, the Δ may begin. The duration of the Δ may depend on the transmission scheme of the UE. If the UE is operating with a single-TRP scheme, the Δ may end at second time 520 and the data transmission may be scheduled after second time 520, such as in subframe 540. If the UE is operating with a multi-TRP scheme, the Δ may end at third time 525 and the data transmission may be scheduled after third time 525, such as in subframe 545.

Figure 6:
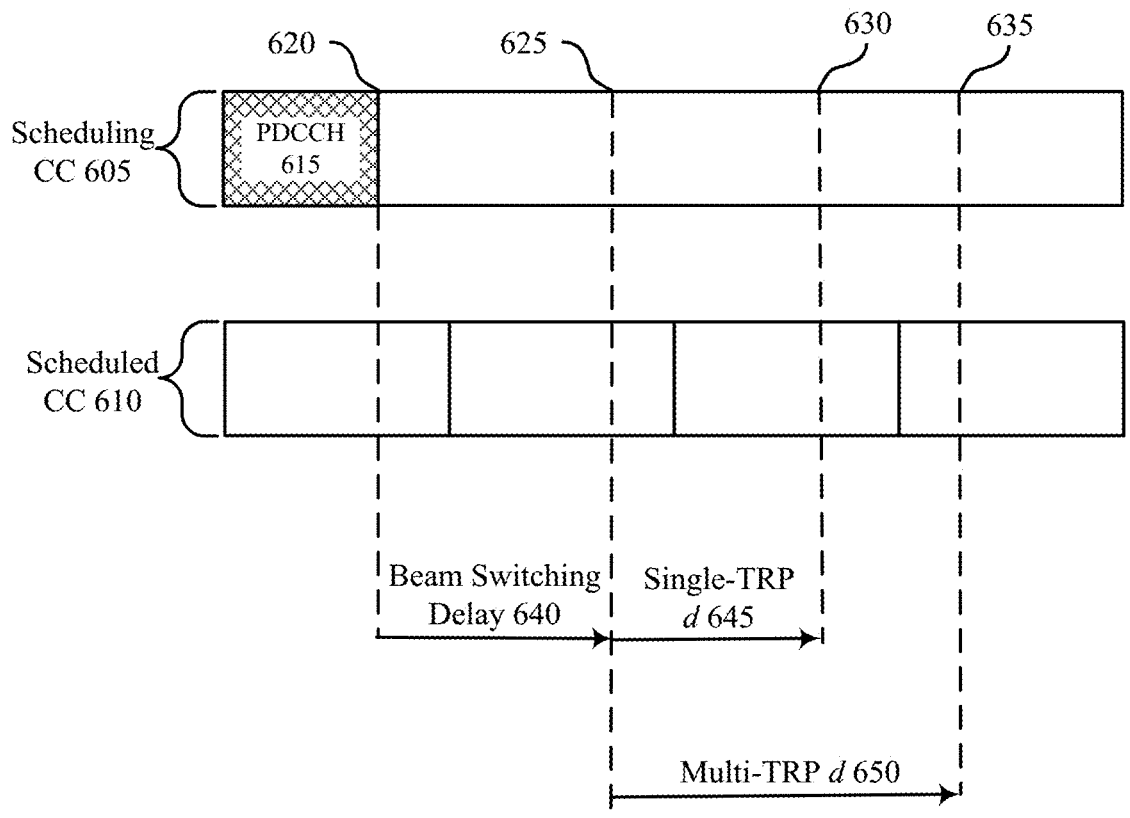
FIG. 6 illustrates an example of a data transmission scheme that supports timing for cross scheduling and reference signal triggering in accordance with aspects of the present disclosure.

FIG. 6 illustrates an example of a data transmission scheme 600 that supports timing for cross scheduling and reference signal triggering in accordance with aspects of the present disclosure. In some examples, data transmission scheme 600 may implement aspects of wireless communications system 100. A UE 115 and a base station 105 may use data transmission schemes 600 for cross-carrier scheduling. In some cases, a base station 105 may transmit a PDCCH 615 on a scheduling CC 605 which may contain a downlink grant, which may be an example of downlink grant 210-a and downlink grant 210-b from communications system 200. PDCCH 615 may schedule a data transmission on a scheduled CC 610, which may be an example of data transmission 220-a from communications system 200.

In data transmission scheme 600, a base station 105 may transmit a PDCCH to UE 115 on a scheduling CC 605 and schedule a data transmission on a scheduled CC 610. The base station may schedule the data transmission with a different d based on if the UE is using a single-TRP scheme or a multi-TRP scheme. The PDCCH 615 ends at a first time 620 and the beam switching delay 640 begins. The beam switching delay 640 ends at a second time 625. If the UE 115 is using a single-TRP scheme, the downlink grant in PDCCH 615 will schedule d of a length defined for the single-TRP scheme. In this example, the d for the single-TRP scheme will end at a third time 630. In this example, the data transmission may begin after the third time 630. If the UE 115 is using a multi-TRP scheme, the downlink grant in PDCCH 615 will schedule a d of a length defined for the multi-TRP scheme. In this case, the d for the single-TRP scheme will end at a fourth time 635. The data transmission may begin after the fourth time 635.

Figure 7:
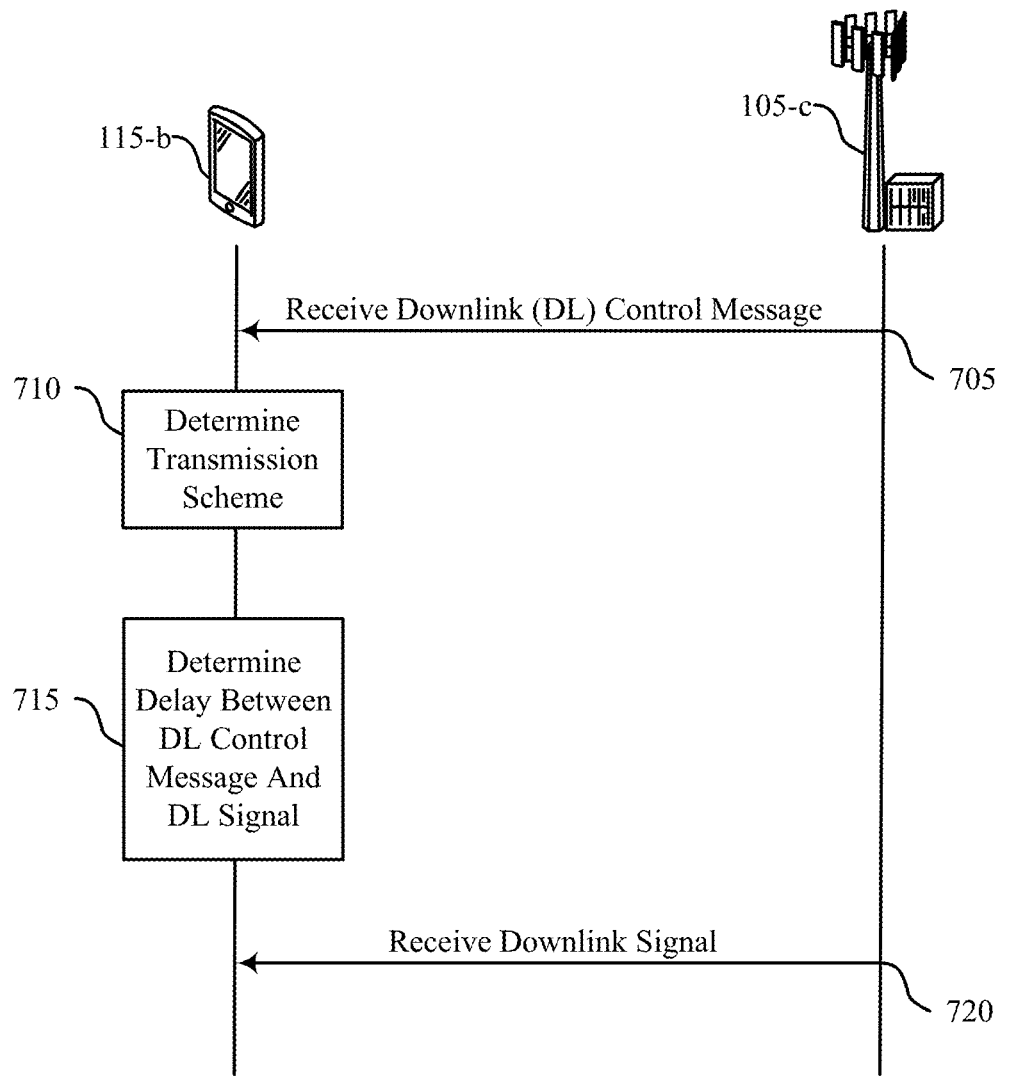
FIG. 7 illustrates an example of a process flow that supports timing for cross scheduling and reference signal triggering in accordance with aspects of the present disclosure.

FIG. 7 illustrates an example of a process flow 700 that supports timing for cross scheduling and reference signal triggering in accordance with aspects of the present disclosure. In some examples, process flow 700 may implement aspects of wireless communications system 100 UE 115-*b* and base station 105-*c* may be examples of UE 115 and base station 105, respectively, as described with reference to FIG. 1. Process flow 700 illustrates an example of a process by which UE 115-*b* may receive a data transmission from base station 105-*c*.

At 705, UE 115-*b* may receive, from a first TRP and via a first carrier configured for the UE, a downlink control message that schedules a downlink signal on a second carrier for the UE. In some examples, the downlink control message may be based at least in part on a UE capability report transmitted by UE 115-*b* indicating one or more delay values for the UE 115-*b*, wherein each of the one or more delay values corresponds to a different transmission scheme of the plurality of transmission schemes.

At 710, UE 115-*b* may determine a transmission scheme of a plurality of transmission schemes based at least in part on the first carrier, the second carrier, and a second TRP scheduled for transmission of the downlink signal. In some examples, where the transmission scheme is a multiple TRP scheme associated with the first TRP and the second TRP, UE 115-*b* may determine the second value for the delay based at least in part on a multiplexing scheme associated with the multiple TRP scheme.

At 715, UE 115-*b* may determine a delay between the downlink control message and the downlink signal based at least in part on the transmission scheme. In some examples, UE 115-*b* may determine a first value for the delay based in part on the first and second TRPs being the same and determine a second value for the delay based at least in part on the first and second TRPs being different. In some examples, UE 115-*b* may determine a first value for the delay based at least in part on the first and second component carriers being the same and determining a second value for the delay based at least in part on the first and second carriers being different. In some examples, UE 115-*b* may determine a third value for the delay based at least in part on the first and second TRPs being the same and determining a fourth value for the delay based at least in part on the first and second TRP being different.

At 720, UE 115-*b* may receive the downlink signal via the second carrier in accordance with the delay determined at 715. In some examples, the downlink signal may include one of a downlink shared channel or a CSI-RS.

Figure 8:
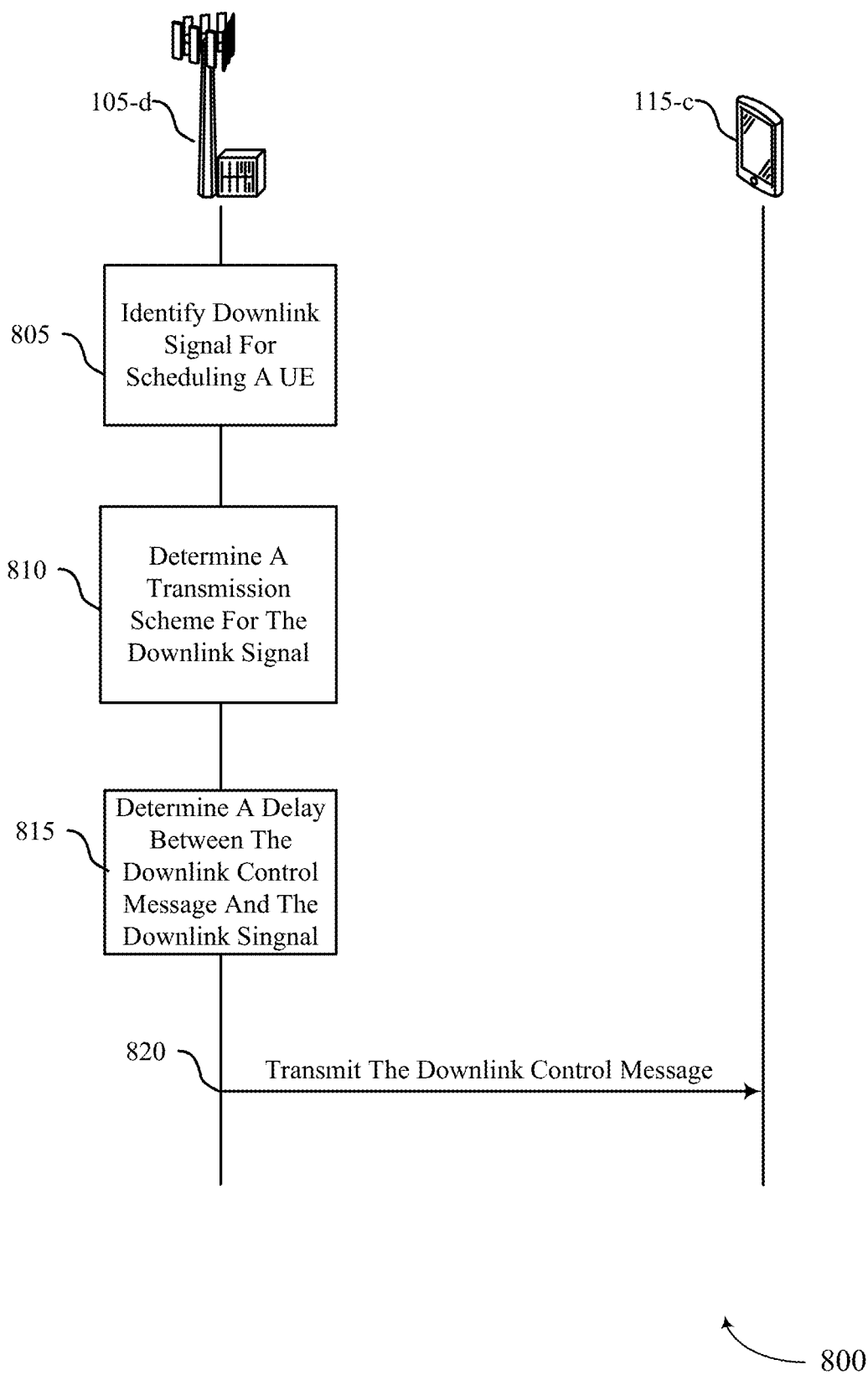
FIG. 8 illustrates an example of a process flow that supports timing for cross scheduling and reference signal triggering in accordance with aspects of the present disclosure.

FIG. 8 illustrates an example of a process flow 800 that supports timing for cross scheduling and reference signal triggering in accordance with aspects of the present disclosure. In some examples, process flow 800 may implement aspects of wireless communications system 100. UE 115-*c* and base station 105-*d* may be examples of UE 115 and base station 105, respectively, as described with reference to FIG. 1. Process flow 800 illustrates an example of a process by which base station 105-*d* may transmit a downlink control message to UE 115-*c*.

At 805, base station 105-*d* may identify a downlink signal for scheduling for a user equipment.

At 810, base station 105-*d* may determine a transmission scheme from a set of possible transmission schemes for the downlink signal based on a first carrier of a downlink control message that schedules the downlink signal and a second carrier for transmission of the downlink signal. In some examples, the transmission scheme may be a multi-TRP scheme associated with the first TRP and the second TRP, where determining the delay further includes determining the second value based at least in part on a multiplexing scheme associated with the multi-TRP scheme.

At 815, base station 105-*d* may determine a delay between the downlink control message and the downlink signal based on the transmission scheme determined at 810. In some examples, determining the delay may include determining a first value for the delay based at least in part on the first and second TRPs being the same and determining a second value for the delay based at least in part on the first and second TRPs being different. In some examples, determining the delay may include determining a first value for the delay based at least in part on the first and second carriers being the same and determining a second value for the delay based at least in part on the first and second carriers being different.

At 820, base station 105-*d* may transmit to the UE 115-*c* and via the first carrier, the downlink control message that schedules the downlink signal on the second carrier for the UE 115-*c* according to the delay determined at 815. In some examples, transmitting the downlink control message may include transmitting an indication of a value of the one or more delay values in the downlink control message based at least in part on the capability report. In some cases, the downlink signal may include one of a PDSCH or a CSI-RS.

Figure 9:
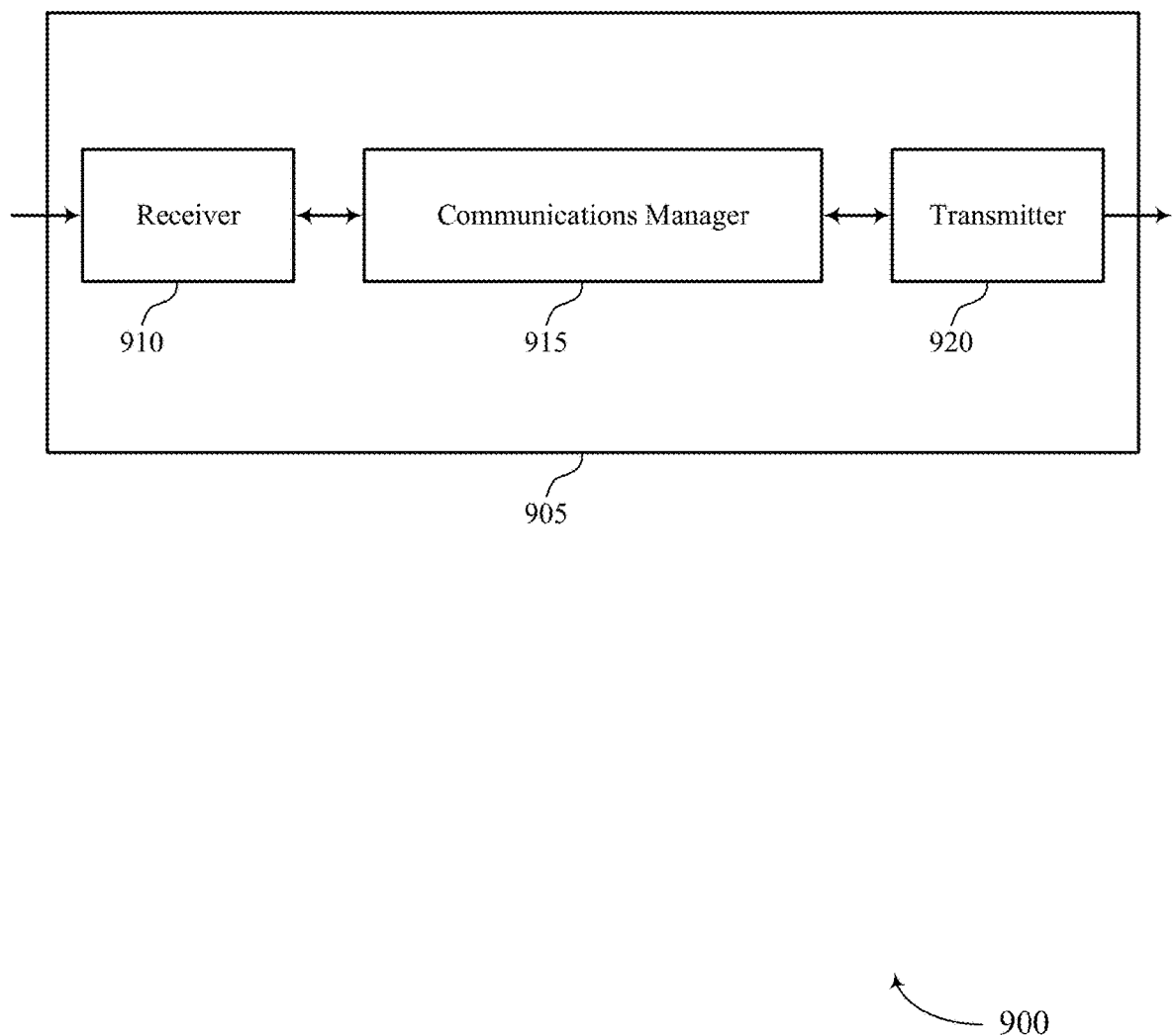
FIG. 9 shows a block diagram of a device that supports timing for cross scheduling and reference signal triggering in accordance with aspects of the present disclosure.

FIG. 9 shows a block diagram 900 of a device 905 that supports timing for cross scheduling and reference signal triggering in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to timing for cross scheduling and reference signal triggering, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a first TRP and via a first carrier configured for the UE, a downlink control message that schedules a downlink signal on a second carrier for the UE, determine a transmission scheme of a set of transmission schemes based on the first carrier, the second carrier, and a second TRP scheduled for transmission of the downlink signal, determine a delay between the downlink control message and the downlink signal based on the transmission scheme, and receive the downlink signal via the second carrier in accordance with the determined delay. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 may be implemented as an integrated circuit or chipset for a mobile device modem, and the receiver 910 and transmitter 920 may be implemented as analog components (e.g., amplifiers, filters, antennas) coupled with the mobile device modem to enable wireless transmission and reception over one or more bands.

The communications manager 915 as described herein may be implemented to realize one or more potential advantages. One implementation may allow the device 905 to provide assistance for scheduling data transmissions between the device 905 and a base station. Based on the techniques for scheduling data transmissions between the device 905 and the base station, the device 905 may support improved scheduling of PDSCH and A-CSI-RS resources in single-TRP, multi-TRP, and SFN transmission schemes and, therefore, more efficient resource utilization.

As such, the device 905 may increase the likelihood of accurately scheduling a PDSCH or triggering a A-CSI-RS using same-carrier or cross carrier scheduling/triggering and using single-TRP, multi-TRP or SFN transmission scheme. Accordingly, device 905 may communicate over the channel with a greater likelihood of successful communications. In some examples, based on a greater likelihood of successful communications, the device 905 may more efficiently power a processor or one or more processing units associated with an PDSCH scheduling or A-CSI-RS triggering procedure and transmitting and receiving communications, which may enable the device to save power and increase batter life.

Figure 10:
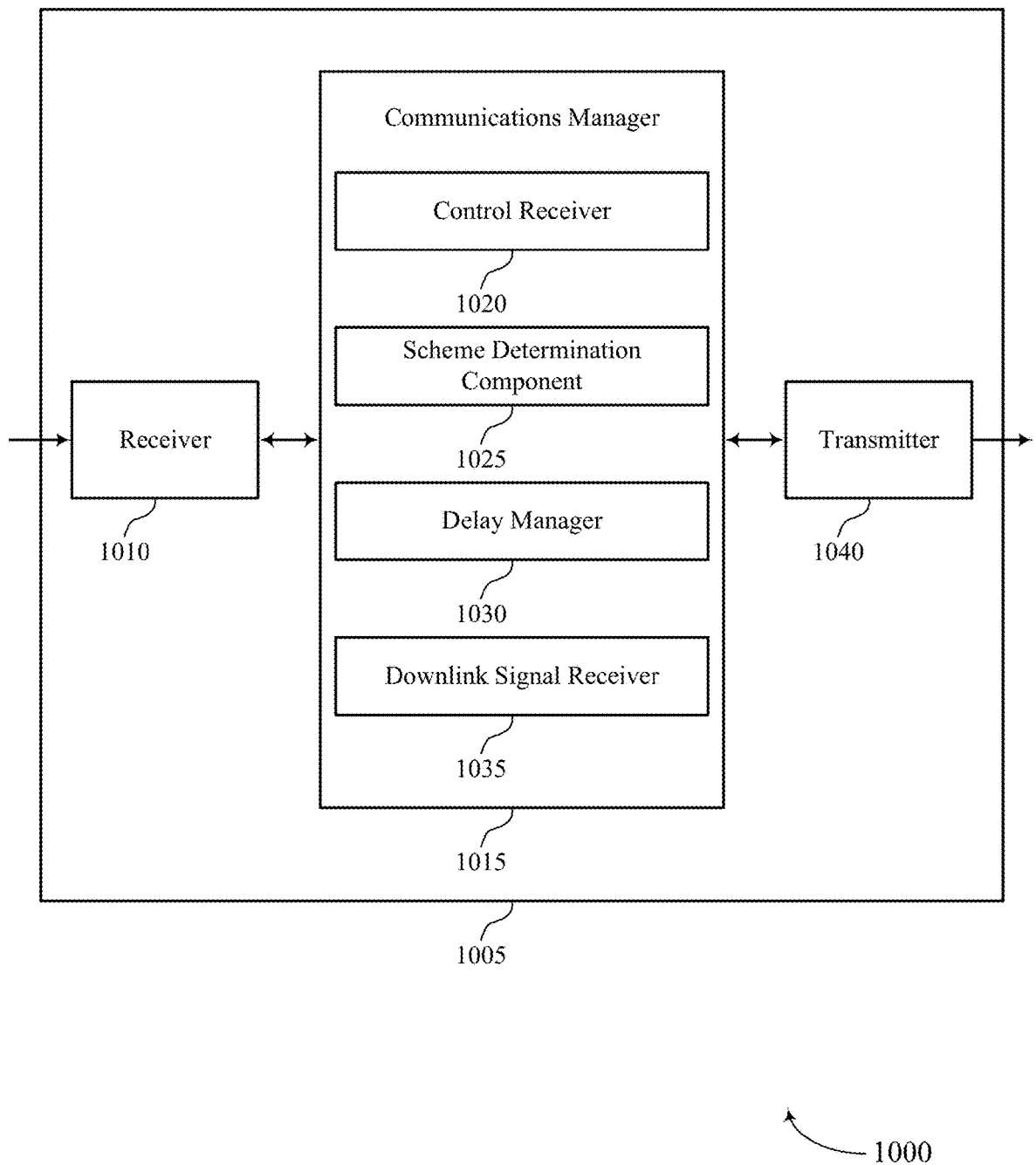
FIG. 10 shows a block diagram of a device that supports timing for cross scheduling and reference signal triggering in accordance with aspects of the present disclosure.

FIG. 10 shows a block diagram 1000 of a device 1005 that supports timing for cross scheduling and reference signal triggering in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to timing for cross scheduling and reference signal triggering, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control receiver 1020, a scheme determination component 1025, a delay manager 1030, and a downlink signal receiver 1035. The communications manager 1015 may be an example of aspects of the communications manager 1210 described herein.

The control receiver 1020 may receive, from a first TRP and via a first carrier configured for the UE, a downlink control message that schedules a downlink signal on a second carrier for the UE.

The scheme determination component 1025 may determine a transmission scheme of a set of transmission schemes based on the first carrier, the second carrier, and a second TRP scheduled for transmission of the downlink signal.

The delay manager 1030 may determine a delay between the downlink control message and the downlink signal based on the transmission scheme.

The downlink signal receiver 1035 may receive the downlink signal via the second carrier in accordance with the determined delay.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
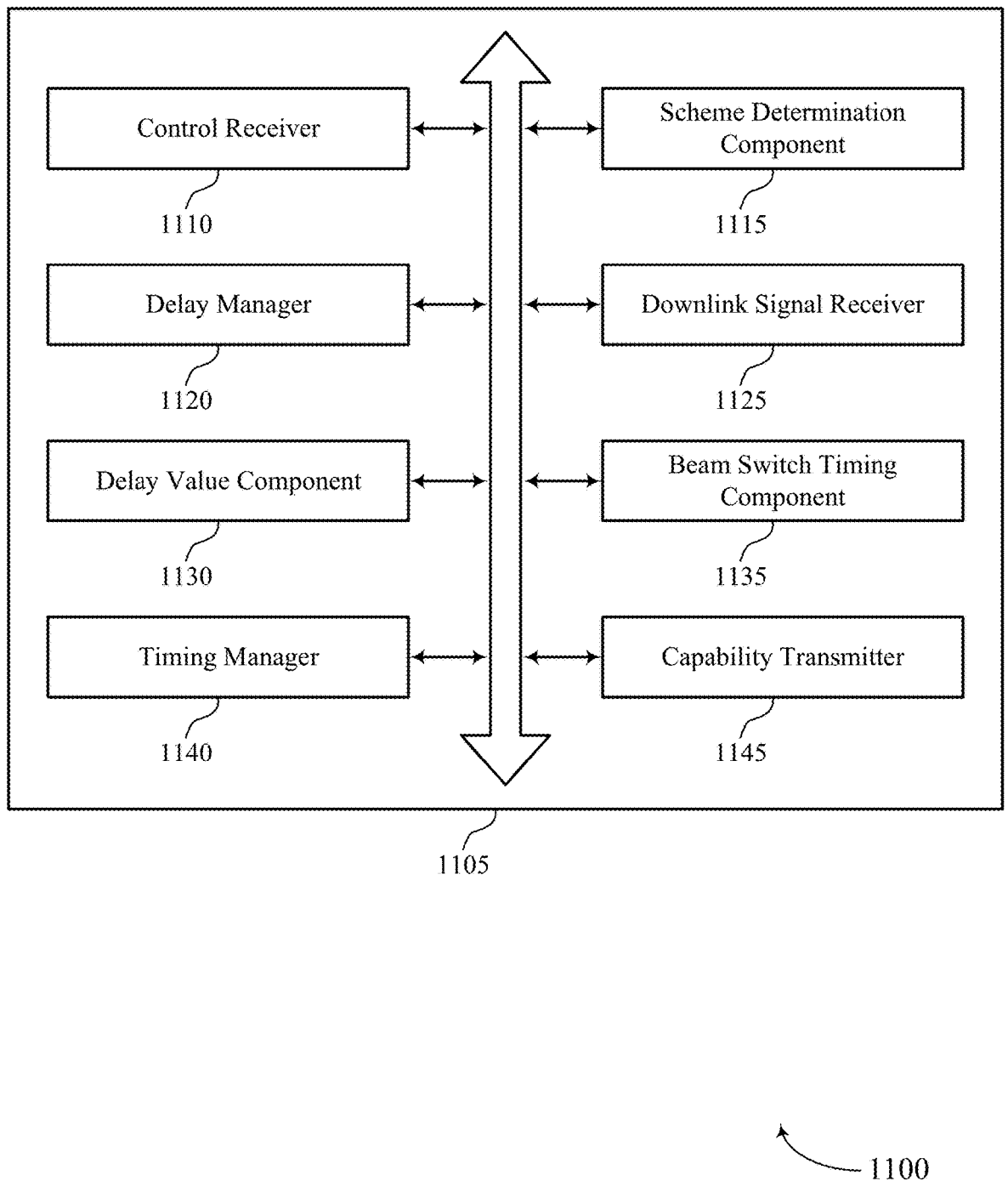
FIG. 11 shows a block diagram of a communications manager that supports timing for cross scheduling and reference signal triggering in accordance with aspects of the present disclosure.

FIG. 11 shows a block diagram 1100 of a communications manager 1105 that supports timing for cross scheduling and reference signal triggering in accordance with aspects of the present disclosure. The communications manager 1105 may be an example of aspects of a communications manager 915, a communications manager 1015, or a communications manager 1210 described herein. The communications manager 1105 may include a control receiver 1110, a scheme determination component 1115, a delay manager 1120, a downlink signal receiver 1125, a delay value component 1130, a beam switch timing component 1135, a timing manager 1140, and a capability transmitter 1145. Each of these modules may communicate, directly or indirectly, with one another (e.g., via one or more buses).

The control receiver 1110 may receive, from a first TRP and via a first carrier configured for the UE, a downlink control message that schedules a downlink signal on a second carrier for the UE.

In some examples, the control receiver 1110 may receive an indication of a value of the one or more delay values in the downlink control message based on the capability report.

The scheme determination component 1115 may determine a transmission scheme of a set of transmission schemes based on the first carrier, the second carrier, and a second TRP scheduled for transmission of the downlink signal.

The delay manager 1120 may determine a delay between the downlink control message and the downlink signal based on the transmission scheme.

In some examples, the delay manager 1120 may determine the delay to be a value of the one or more delay values indicated in the capability report.

In some examples, the delay manager 1120 may determine the delay based on an SCS associated with the first carrier used for receiving the downlink control message.

In some cases, the delay includes a scheduling delay or a beam switching timing and corresponds to a number of symbols between an end symbol of the downlink control message and a start symbol of the downlink signal.

The downlink signal receiver 1125 may receive the downlink signal via the second carrier in accordance with the determined delay.

In some cases, the downlink signal includes one of a downlink shared channel or a CSI-RS.

The delay value component 1130 may determine a first value for the delay based on the first and second TRPs being the same.

In some examples, the delay value component 1130 may determine a second value for the delay based on the first and second TRPs being different.

In some examples, the delay value component 1130 may determine the second value based on a multiplexing scheme associated with the multiple TRP scheme.

In some examples, the delay value component 1130 may determine a first value for the delay based on the first and second carriers being the same.

In some examples, the delay value component 1130 may determine a second value for the delay based on the first and second carriers being different.

In some examples, the delay value component 1130 may determine a third value for the delay based on the first and second TRPs being the same.

In some examples, the delay value component 1130 may determine a fourth value for the delay based on the first and second TRPs being different.

The beam switch timing component 1135 may determine a beam switching timing corresponding to a number of symbols for switching from a first beam associated with the first carrier to a second beam associated with the second carrier.

The timing manager 1140 may determine an additional timing based on the transmission scheme.

The capability transmitter 1145 may transmit a capability report to the first TRP indicating one or more delay values for the UE, where each of the one or more delay values corresponds to a different transmission scheme of the set of transmission schemes.

Figure 12:
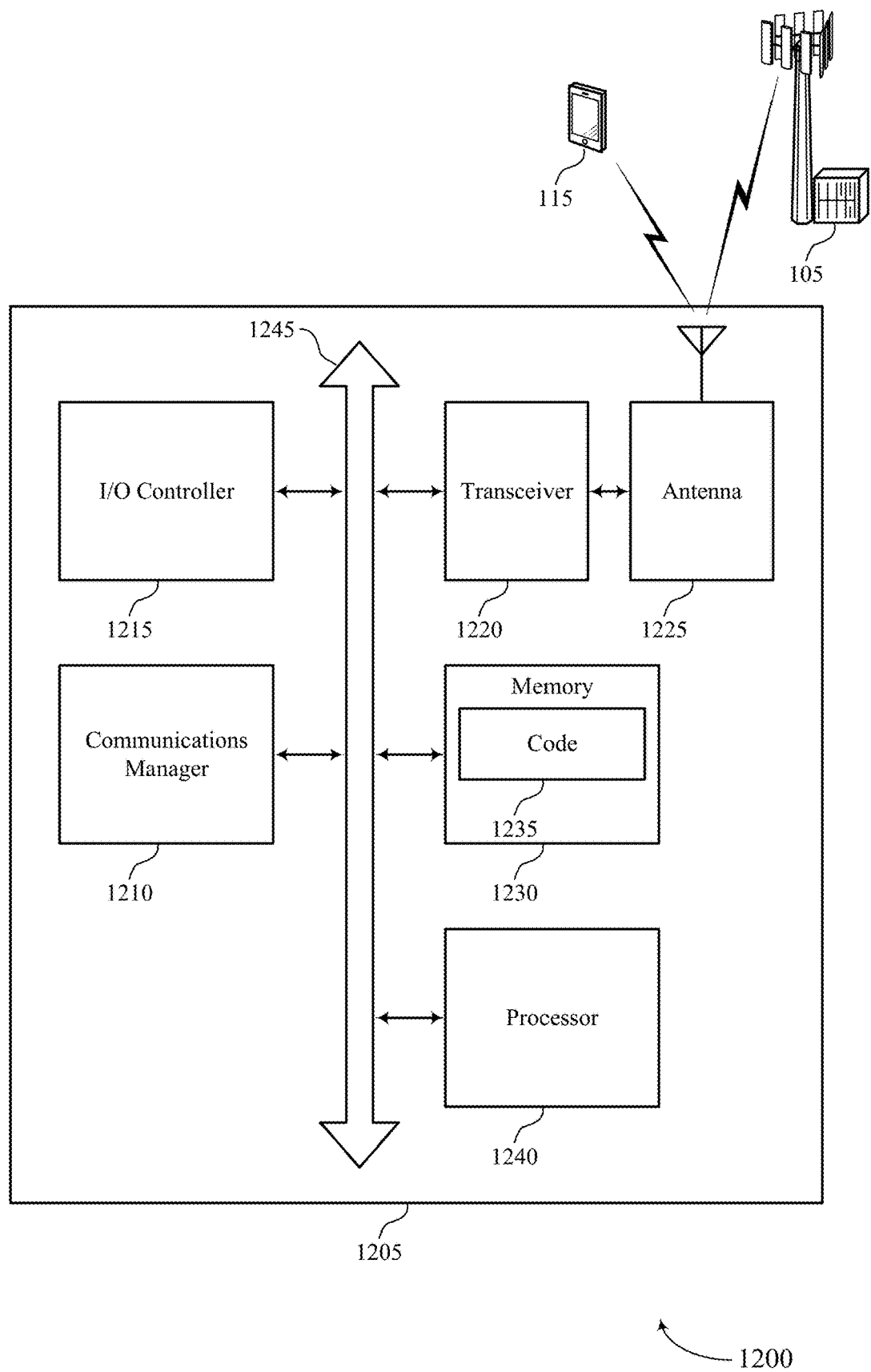
FIG. 12 shows a diagram of a system that includes a device that supports timing for cross scheduling and reference signal triggering in accordance with aspects of the present disclosure.

FIG. 12 shows a diagram of a system 1200 including a device 1205 that supports timing for cross scheduling and reference signal triggering in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive, from a first TRP and via a first carrier configured for the UE, a downlink control message that schedules a downlink signal on a second carrier for the UE, determine a transmission scheme of a set of transmission schemes based on the first carrier, the second carrier, and a second TRP scheduled for transmission of the downlink signal, determine a delay between the downlink control message and the downlink signal based on the transmission scheme, and receive the downlink signal via the second carrier in accordance with the determined delay.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting timing for cross scheduling and reference signal triggering).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
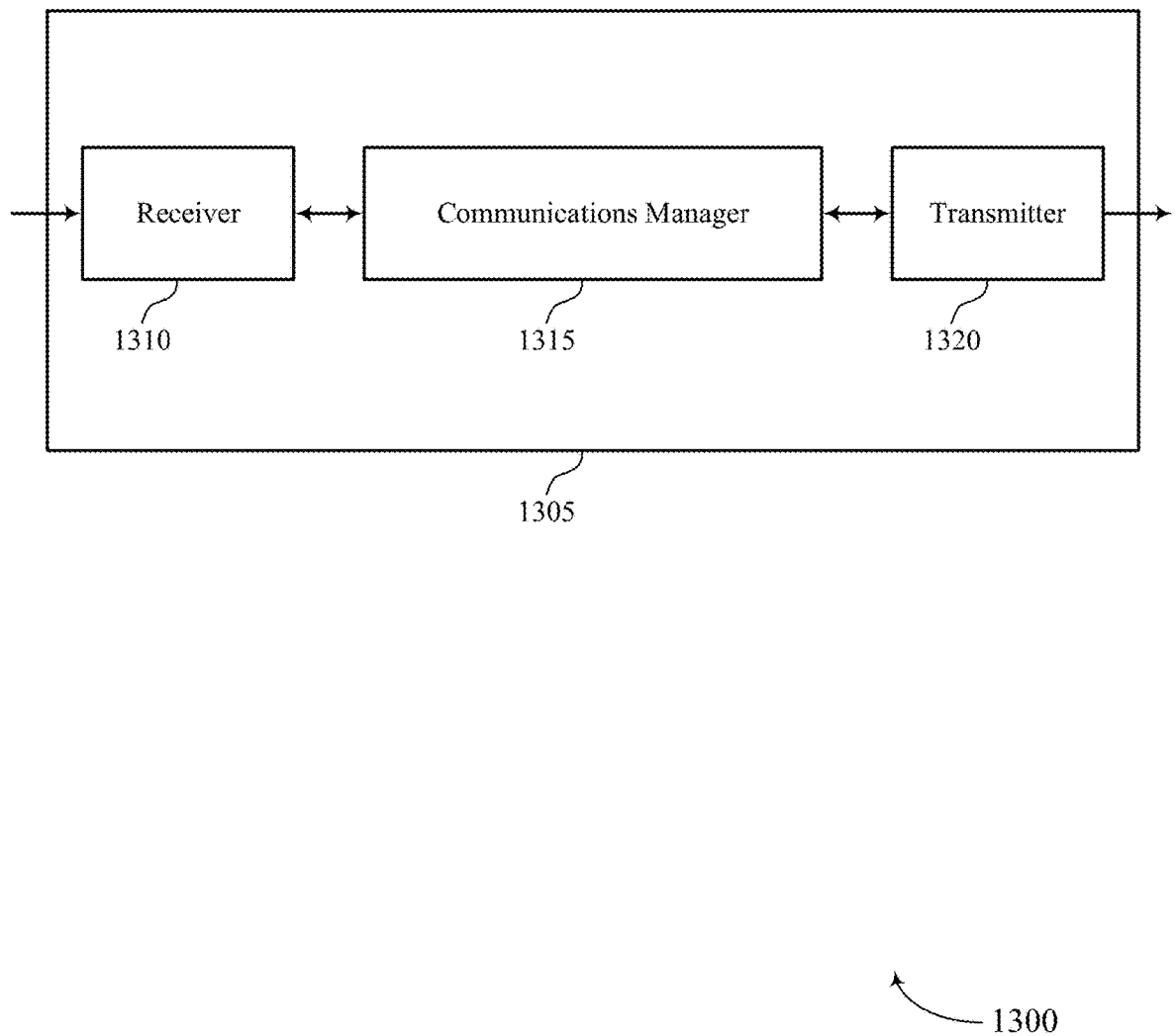
FIG. 13 shows a block diagram of a device that supports timing for cross scheduling and reference signal triggering in accordance with aspects of the present disclosure.

FIG. 13 shows a block diagram 1300 of a device 1305 that supports timing for cross scheduling and reference signal triggering in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to timing for cross scheduling and reference signal triggering, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify a downlink signal for scheduling for a UE, determine a transmission scheme of a set of transmission schemes for the downlink signal based on a first carrier of a downlink control message that schedules the downlink signal, a second carrier for transmission of the downlink signal, and a second TRP used for transmission of the downlink signal, determine a delay between the downlink control message and the downlink signal based on the transmission scheme, and transmit, to a UE and via the first carrier, the downlink control message that schedules the downlink signal on the second carrier for the UE according to the determined delay. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
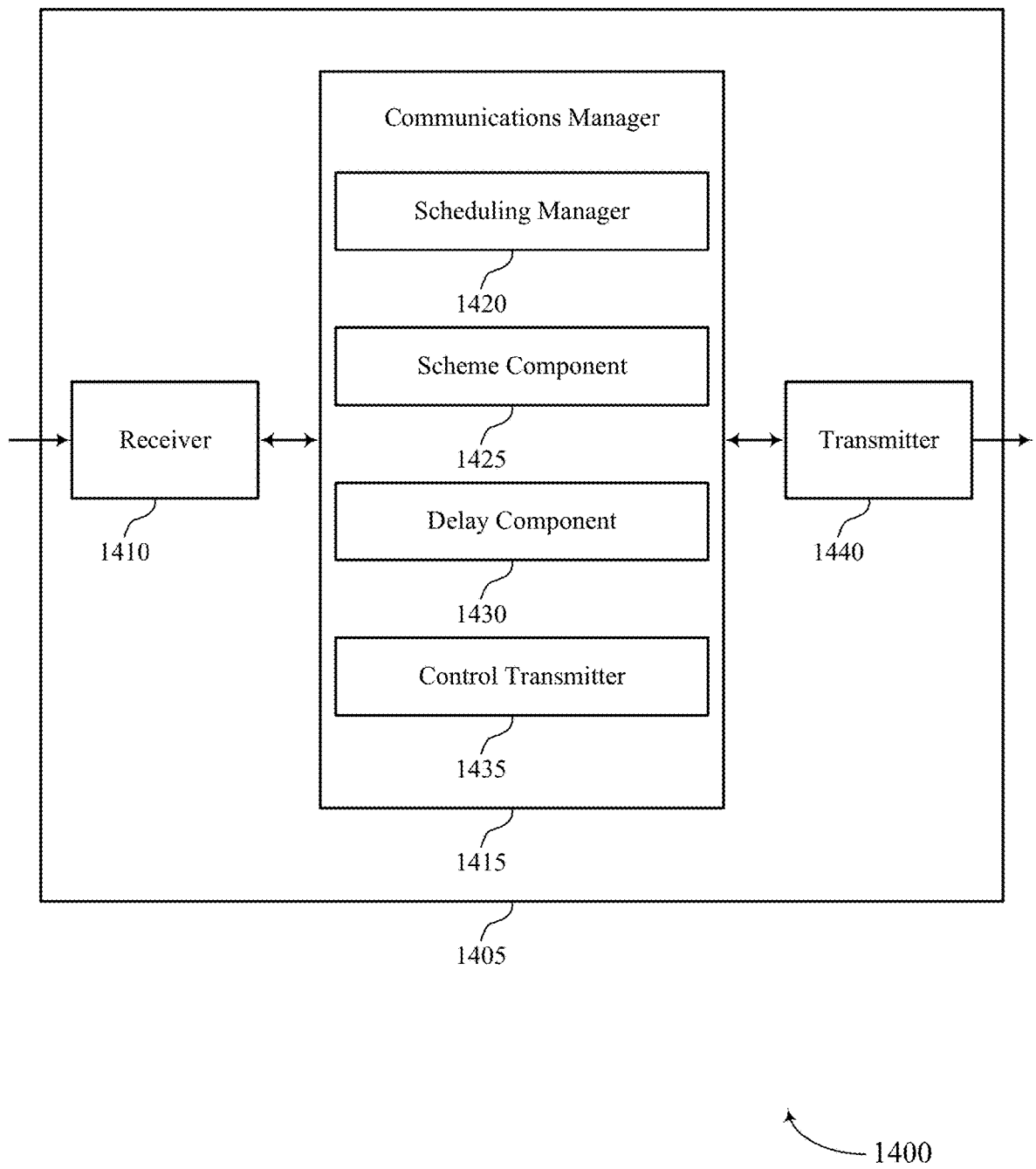
FIG. 14 shows a block diagram of a device that supports timing for cross scheduling and reference signal triggering in accordance with aspects of the present disclosure.

FIG. 14 shows a block diagram 1400 of a device 1405 that supports timing for cross scheduling and reference signal triggering in accordance with aspects of the present disclosure. The device 1405 may be an example of aspects of a device 1305, or a base station 105 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to timing for cross scheduling and reference signal triggering, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a scheduling manager 1420, a scheme component 1425, a delay component 1430, and a control transmitter 1435. The communications manager 1415 may be an example of aspects of the communications manager 1610 described herein.

The scheduling manager 1420 may identify a downlink signal for scheduling for a UE.

The scheme component 1425 may determine a transmission scheme of a set of transmission schemes for the downlink signal based on a first carrier of a downlink control message that schedules the downlink signal, a second carrier for transmission of the downlink signal, and a second TRP used for transmission of the downlink signal.

The delay component 1430 may determine a delay between the downlink control message and the downlink signal based on the transmission scheme.

The control transmitter 1435 may transmit, to a UE and via the first carrier, the downlink control message that schedules the downlink signal on the second carrier for the UE according to the determined delay.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
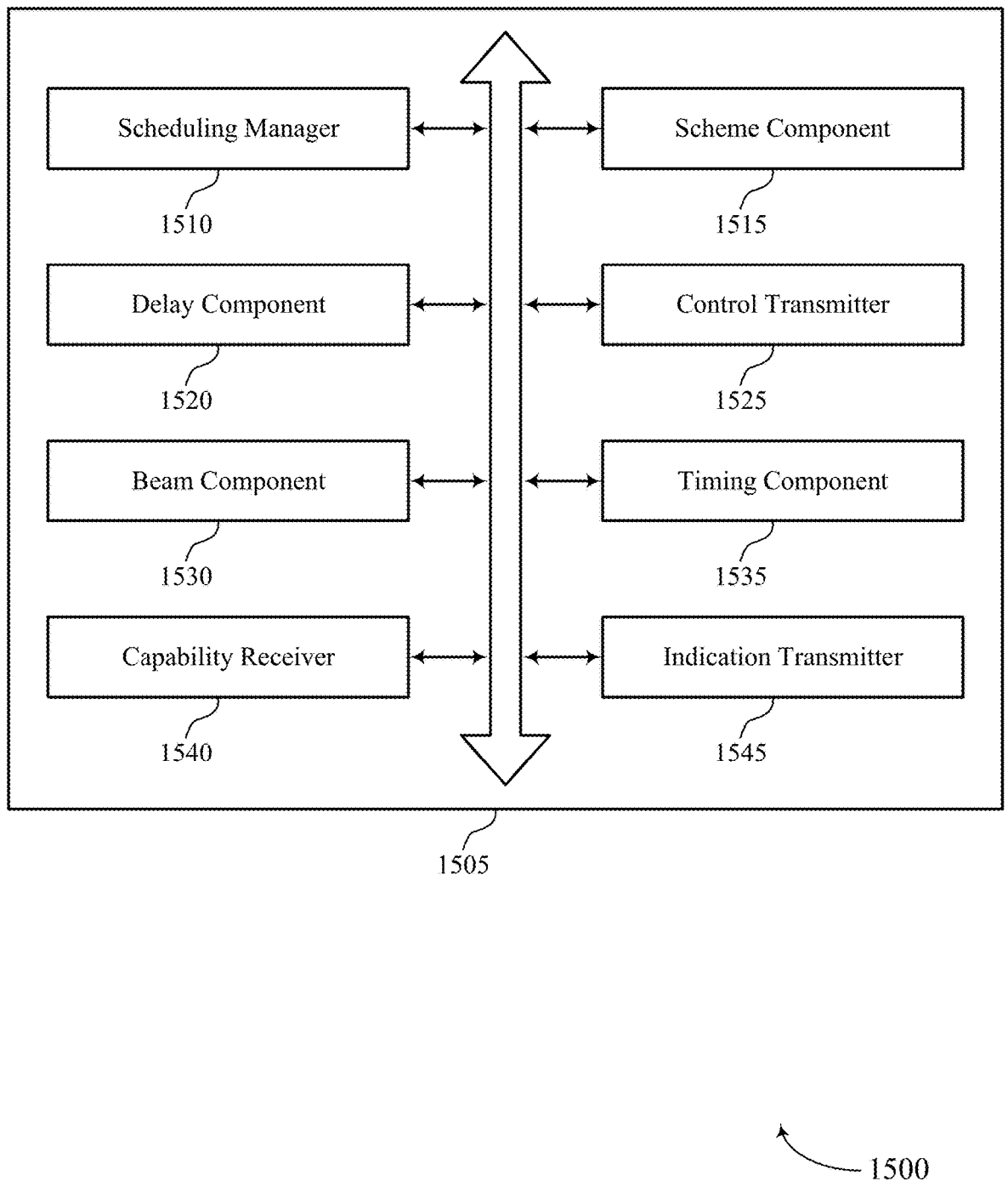
FIG. 15 shows a block diagram of a communications manager that supports timing for cross scheduling and reference signal triggering in accordance with aspects of the present disclosure.

FIG. 15 shows a block diagram 1500 of a communications manager 1505 that supports timing for cross scheduling and reference signal triggering in accordance with aspects of the present disclosure. The communications manager 1505 may be an example of aspects of a communications manager 1315, a communications manager 1415, or a communications manager 1610 described herein. The communications manager 1505 may include a scheduling manager 1510, a scheme component 1515, a delay component 1520, a control transmitter 1525, a beam component 1530, a timing component 1535, a capability receiver 1540, and an indication transmitter 1545. Each of these modules may communicate, directly or indirectly, with one another (e.g., via one or more buses).

The scheduling manager 1510 may identify a downlink signal for scheduling for a UE.

The scheme component 1515 may determine a transmission scheme of a set of transmission schemes for the downlink signal based on a first carrier of a downlink control message that schedules the downlink signal, a second carrier for transmission of the downlink signal, and a second TRP used for transmission of the downlink signal.

The delay component 1520 may determine a delay between the downlink control message and the downlink signal based on the transmission scheme.

In some examples, the delay component 1520 may determine a first value for the delay based on the first and second TRPs being the same.

In some examples, the delay component 1520 may determine a second value for the delay based on the first and second TRPs being different.

In some examples, the delay component 1520 may determine the second value based on a multiplexing scheme associated with the multiple TRP scheme.

In some examples, the delay component 1520 may determine a first value for the delay based on the first and second carriers being the same.

In some examples, the delay component 1520 may determine a second value for the delay based on the first and second carriers being different.

In some examples, the delay component 1520 may determine a third value for the delay based on the first and second TRPs being the same.

In some examples, the delay component 1520 may determine a fourth value for the delay based on the first and second TRPs being different.

In some examples, the delay component 1520 may determine the delay to be a value of the one or more delay values indicated in the capability report.

In some examples, the delay component 1520 may determine the delay based on an SCS associated with the first carrier used for receiving the downlink control message.

In some cases, the delay includes a scheduling delay or a beam switching timing and corresponds to a number of symbols between an end symbol of the downlink control message and a start symbol of the downlink signal.

The control transmitter 1525 may transmit, to a UE and via the first carrier, the downlink control message that schedules the downlink signal on the second carrier for the UE according to the determined delay.

In some cases, the downlink signal includes one of a downlink shared channel or a CSI-RS.

The beam component 1530 may determine a beam switching timing corresponding to a number of symbols for switching from a first beam associated with the first carrier to a second beam associated with the second carrier.

The timing component 1535 may determine an additional timing based on the transmission scheme.

The capability receiver 1540 may receive a capability report from the UE indicating one or more delay values for the UE, where each of the one or more delay values corresponds to a different transmission scheme of the set of transmission schemes.

The indication transmitter 1545 may transmit an indication of a value of the one or more delay values in the downlink control message based on the capability report.

Figure 16:
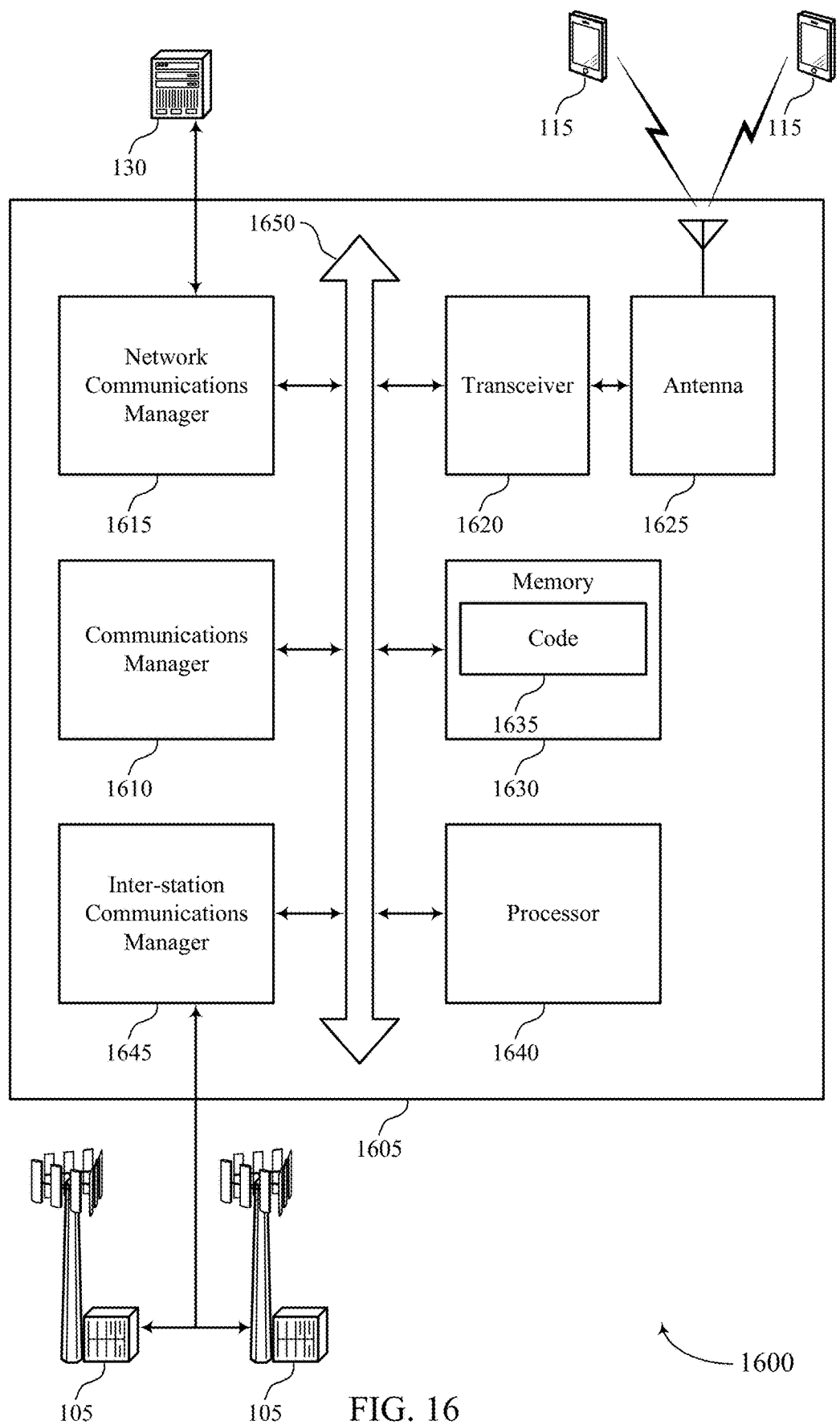
FIG. 16 shows a diagram of a system that includes a device that supports timing for cross scheduling and reference signal triggering in accordance with aspects of the present disclosure.

FIG. 16 shows a diagram of a system 1600 including a device 1605 that supports timing for cross scheduling and reference signal triggering in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may identify a downlink signal for scheduling for a UE, determine a transmission scheme of a set of transmission schemes for the downlink signal based on a first carrier of a downlink control message that schedules the downlink signal, a second carrier for transmission of the downlink signal, and a second TRP used for transmission of the downlink signal, determine a delay between the downlink control message and the downlink signal based on the transmission scheme, and transmit, to a UE and via the first carrier, the downlink control message that schedules the downlink signal on the second carrier for the UE according to the determined delay.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include random access memory (RAM), read only memory (ROM), or a combination thereof. The memory 1630 may store computer-readable code 1635 including instructions that, when executed by a processor (e.g., the processor 1640) cause the device to perform various functions described herein. In some cases, the memory 1630 may contain, among other things, a basic I/O system (BIOS) which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting timing for cross scheduling and reference signal triggering).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
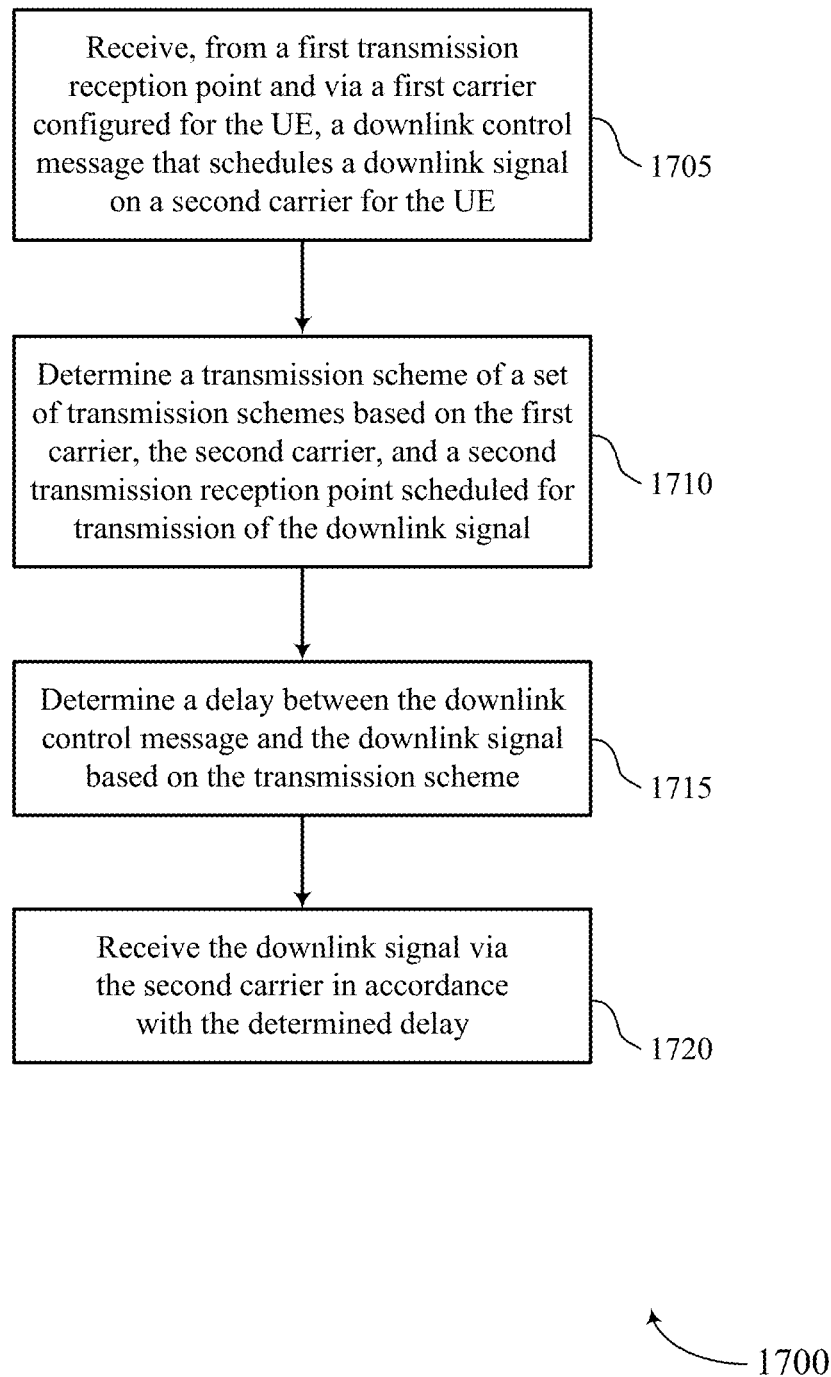
FIGS. 17 through 23 show flowcharts illustrating methods that support timing for cross scheduling and reference signal triggering in accordance with aspects of the present disclosure.

FIG. 17 shows a flowchart illustrating a method 1700 that supports timing for cross scheduling and reference signal triggering in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described herein. Additionally, or alternatively, a UE may perform aspects of the functions described herein using special-purpose hardware.

At 1705, the UE may receive, from a first TRP and via a first carrier configured for the UE, a downlink control message that schedules a downlink signal on a second carrier for the UE. The operations of 1705 may be performed according to the methods described herein. In some examples, aspects of the operations of 1705 may be performed by a control receiver as described with reference to FIGS. 9 through 12.

At 1710, the UE may determine a transmission scheme of a set of transmission schemes based on the first carrier, the second carrier, and a second TRP scheduled for transmission of the downlink signal. The operations of 1710 may be performed according to the methods described herein. In some examples, aspects of the operations of 1710 may be performed by a scheme determination component as described with reference to FIGS. 9 through 12.

At 1715, the UE may determine a delay between the downlink control message and the downlink signal based on the transmission scheme. The operations of 1715 may be performed according to the methods described herein. In some examples, aspects of the operations of 1715 may be performed by a delay manager as described with reference to FIGS. 9 through 12.

At 1720, the UE may receive the downlink signal via the second carrier in accordance with the determined delay. The operations of 1720 may be performed according to the methods described herein. In some examples, aspects of the operations of 1720 may be performed by a downlink signal receiver as described with reference to FIGS. 9 through 12.

Figure 18:
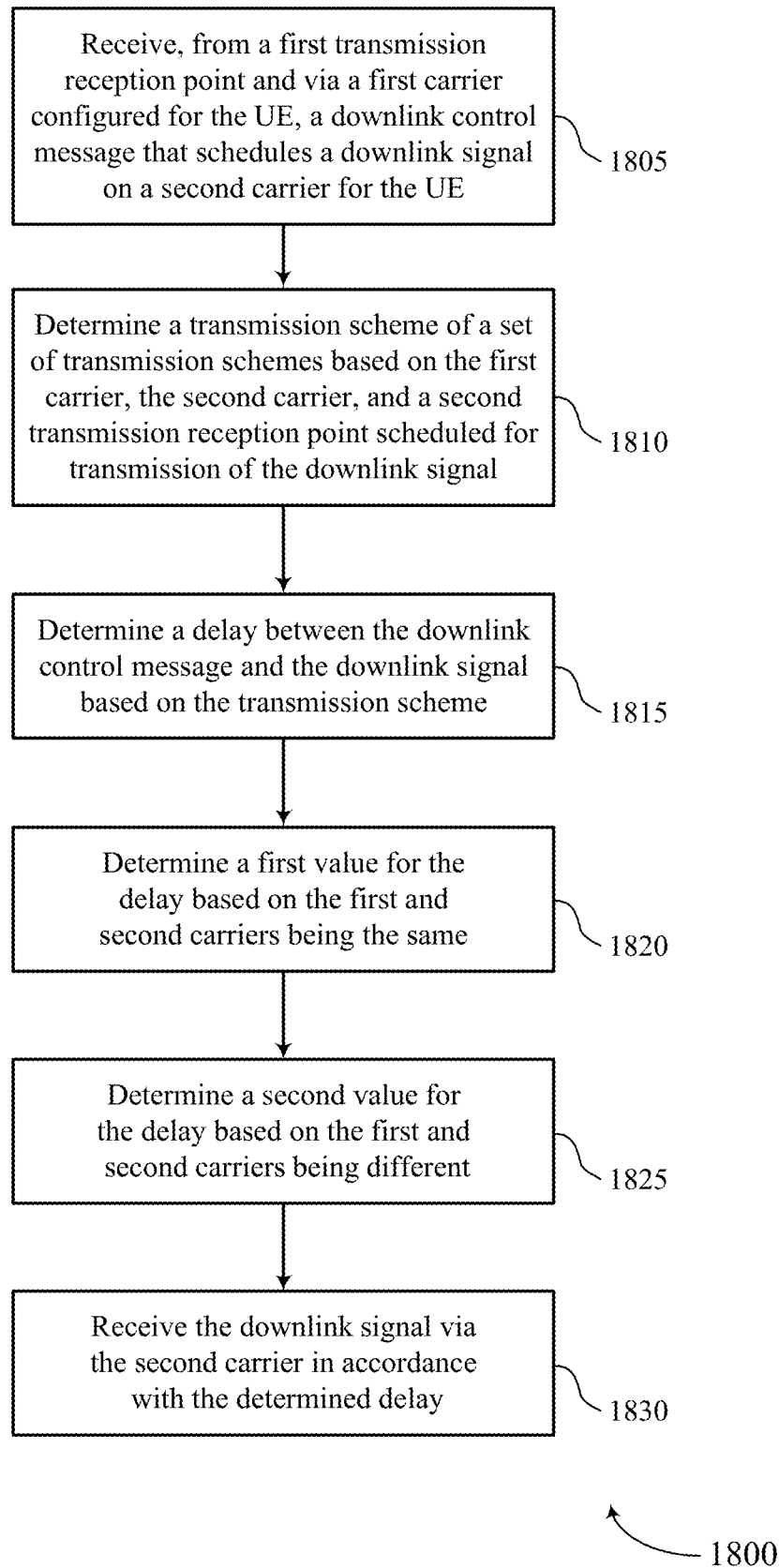

FIG. 18 shows a flowchart illustrating a method 1800 that supports timing for cross scheduling and reference signal triggering in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described herein. Additionally, or alternatively, a UE may perform aspects of the functions described herein using special-purpose hardware.

At 1805, the UE may receive, from a first TRP and via a first carrier configured for the UE, a downlink control message that schedules a downlink signal on a second carrier for the UE. The operations of 1805 may be performed according to the methods described herein. In some examples, aspects of the operations of 1805 may be performed by a control receiver as described with reference to FIGS. 9 through 12.

At 1810, the UE may determine a transmission scheme of a set of transmission schemes based on the first carrier, the second carrier, and a second TRP scheduled for transmission of the downlink signal. The operations of 1810 may be performed according to the methods described herein. In some examples, aspects of the operations of 1810 may be performed by a scheme determination component as described with reference to FIGS. 9 through 12.

At 1815, the UE may determine a delay between the downlink control message and the downlink signal based on the transmission scheme. The operations of 1815 may be performed according to the methods described herein. In some examples, aspects of the operations of 1815 may be performed by a delay manager as described with reference to FIGS. 9 through 12.

At 1820, the UE may determine a first value for the delay based on the first and second carriers being the same. The operations of 1820 may be performed according to the methods described herein. In some examples, aspects of the operations of 1820 may be performed by a delay value component as described with reference to FIGS. 9 through 12.

At 1825, the UE may determine a second value for the delay based on the first and second carriers being different. The operations of 1825 may be performed according to the methods described herein. In some examples, aspects of the operations of 1825 may be performed by a delay value component as described with reference to FIGS. 9 through 12.

At 1830, the UE may receive the downlink signal via the second carrier in accordance with the determined delay. The operations of 1830 may be performed according to the methods described herein. In some examples, aspects of the operations of 1830 may be performed by a downlink signal receiver as described with reference to FIGS. 9 through 12.

Figure 19:
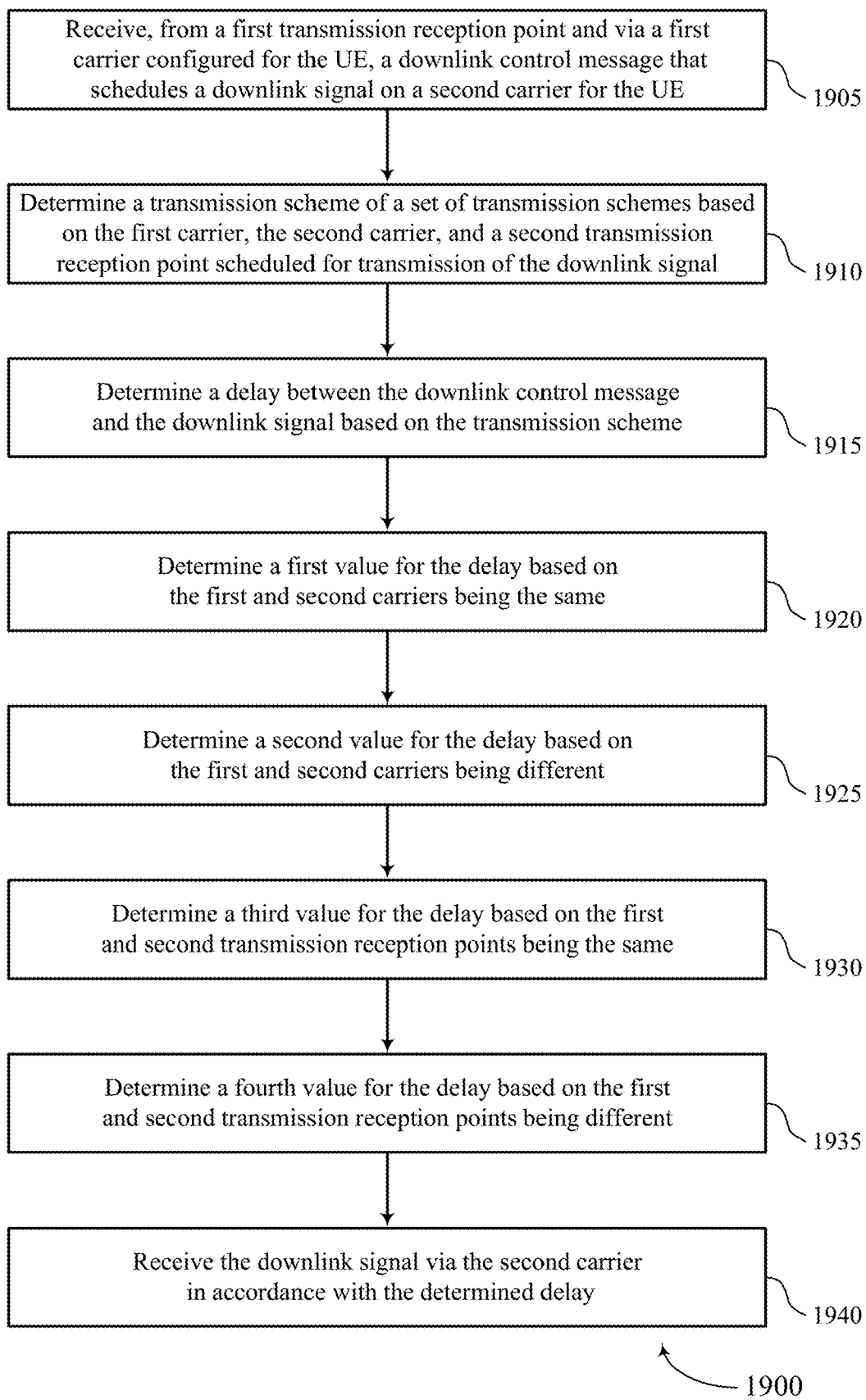

FIG. 19 shows a flowchart illustrating a method 1900 that supports timing for cross scheduling and reference signal triggering in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described herein. Additionally, or alternatively, a UE may perform aspects of the functions described herein using special-purpose hardware.

At 1905, the UE may receive, from a first TRP and via a first carrier configured for the UE, a downlink control message that schedules a downlink signal on a second carrier for the UE. The operations of 1905 may be performed according to the methods described herein. In some examples, aspects of the operations of 1905 may be performed by a control receiver as described with reference to FIGS. 9 through 12.

At 1910, the UE may determine a transmission scheme of a set of transmission schemes based on the first carrier, the second carrier, and a second TRP scheduled for transmission of the downlink signal. The operations of 1910 may be performed according to the methods described herein. In some examples, aspects of the operations of 1910 may be performed by a scheme determination component as described with reference to FIGS. 9 through 12.

At 1915, the UE may determine a delay between the downlink control message and the downlink signal based on the transmission scheme. The operations of 1915 may be performed according to the methods described herein. In some examples, aspects of the operations of 1915 may be performed by a delay manager as described with reference to FIGS. 9 through 12.

At 1920, the UE may determine a first value for the delay based on the first and second carriers being the same. The operations of 1920 may be performed according to the methods described herein. In some examples, aspects of the operations of 1920 may be performed by a delay value component as described with reference to FIGS. 9 through 12.

At 1925, the UE may determine a second value for the delay based on the first and second carriers being different. The operations of 1925 may be performed according to the methods described herein. In some examples, aspects of the operations of 1925 may be performed by a delay value component as described with reference to FIGS. 9 through 12.

At 1930, the UE may determine a third value for the delay based on the first and second TRPs being the same. The operations of 1930 may be performed according to the methods described herein. In some examples, aspects of the operations of 1930 may be performed by a delay value component as described with reference to FIGS. 9 through 12.

At 1935, the UE may determine a fourth value for the delay based on the first and second TRPs being different. The operations of 1935 may be performed according to the methods described herein. In some examples, aspects of the operations of 1935 may be performed by a delay value component as described with reference to FIGS. 9 through 12.

At 1940, the UE may receive the downlink signal via the second carrier in accordance with the determined delay. The operations of 1940 may be performed according to the methods described herein. In some examples, aspects of the operations of 1940 may be performed by a downlink signal receiver as described with reference to FIGS. 9 through 12.

Figure 20:
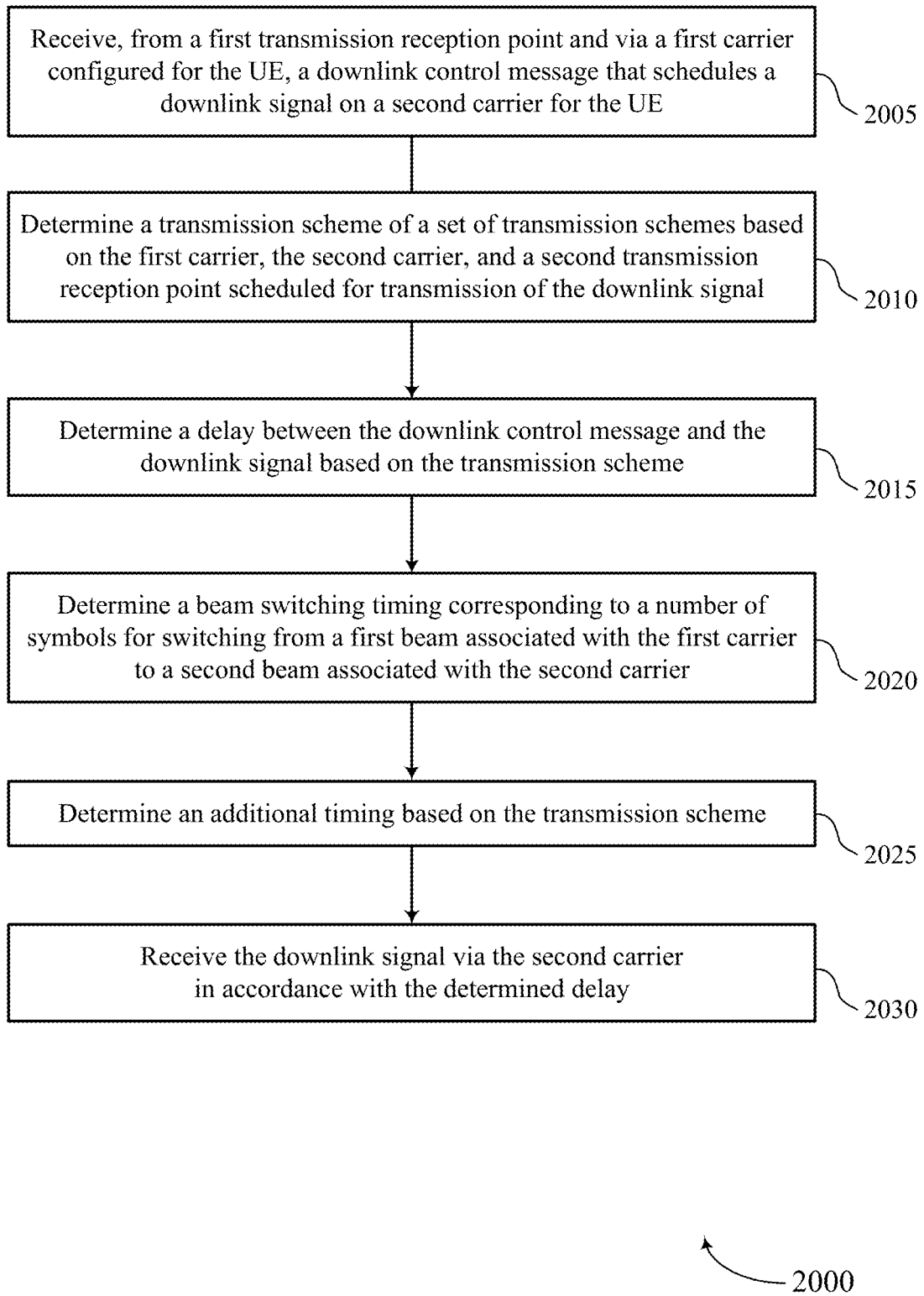

FIG. 20 shows a flowchart illustrating a method 2000 that supports timing for cross scheduling and reference signal triggering in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described herein. Additionally, or alternatively, a UE may perform aspects of the functions described herein using special-purpose hardware.

At 2005, the UE may receive, from a first TRP and via a first carrier configured for the UE, a downlink control message that schedules a downlink signal on a second carrier for the UE. The operations of 2005 may be performed according to the methods described herein. In some examples, aspects of the operations of 2005 may be performed by a control receiver as described with reference to FIGS. 9 through 12.

At 2010, the UE may determine a transmission scheme of a set of transmission schemes based on the first carrier, the second carrier, and a second TRP scheduled for transmission of the downlink signal. The operations of 2010 may be performed according to the methods described herein. In some examples, aspects of the operations of 2010 may be performed by a scheme determination component as described with reference to FIGS. 9 through 12.

At 2015, the UE may determine a delay between the downlink control message and the downlink signal based on the transmission scheme. The operations of 2015 may be performed according to the methods described herein. In some examples, aspects of the operations of 2015 may be performed by a delay manager as described with reference to FIGS. 9 through 12.

At 2020, the UE may determine a beam switching timing corresponding to a number of symbols for switching from a first beam associated with the first carrier to a second beam associated with the second carrier. The operations of 2020 may be performed according to the methods described herein. In some examples, aspects of the operations of 2020 may be performed by a beam switch timing component as described with reference to FIGS. 9 through 12.

At 2025, the UE may determine an additional timing based on the transmission scheme. The operations of 2025 may be performed according to the methods described herein. In some examples, aspects of the operations of 2025 may be performed by a timing manager as described with reference to FIGS. 9 through 12.

At 2030, the UE may receive the downlink signal via the second carrier in accordance with the determined delay. The operations of 2030 may be performed according to the methods described herein. In some examples, aspects of the operations of 2030 may be performed by a downlink signal receiver as described with reference to FIGS. 9 through 12.

Figure 21:
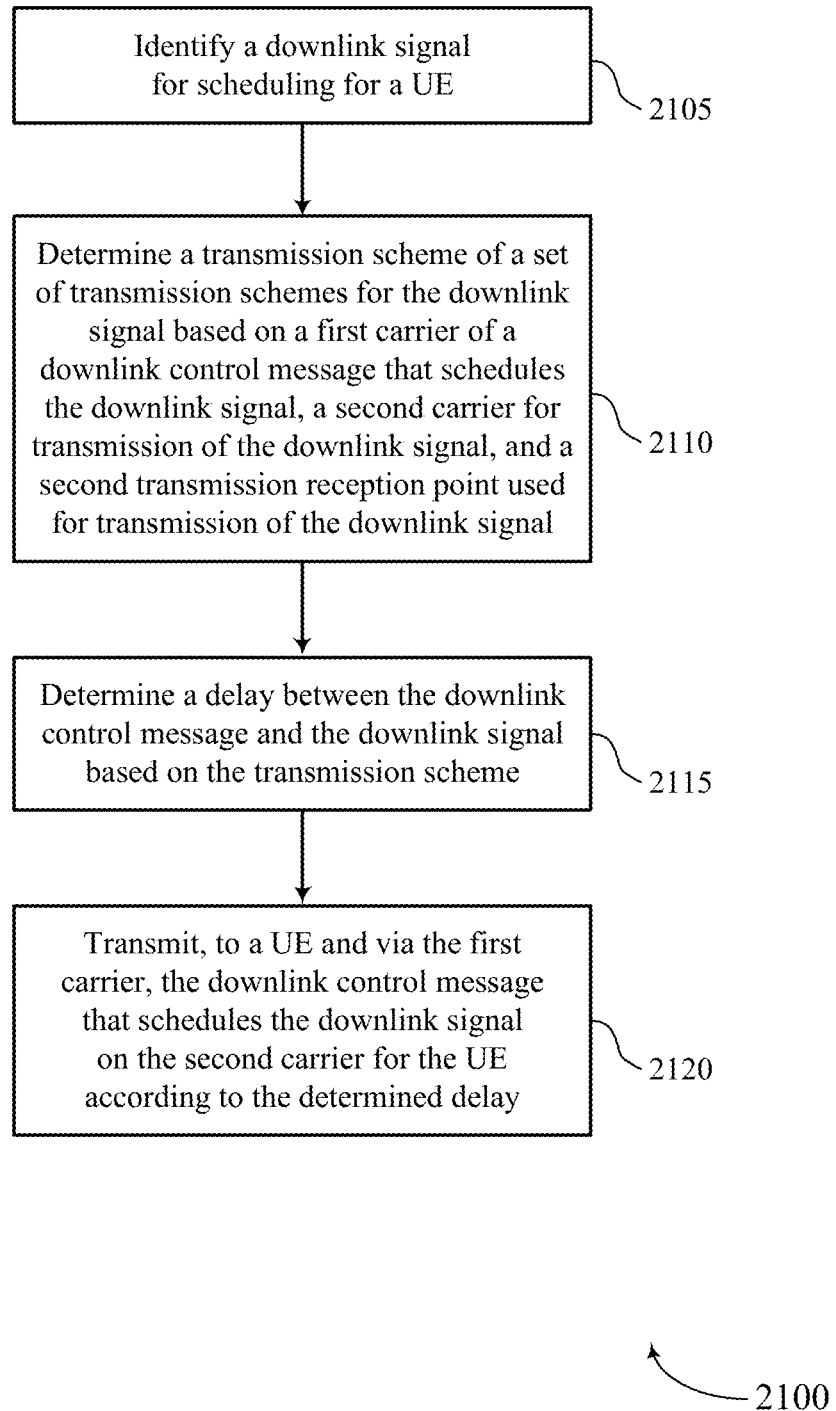

FIG. 21 shows a flowchart illustrating a method 2100 that supports timing for cross scheduling and reference signal triggering in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described herein. Additionally, or alternatively, a base station may perform aspects of the functions described herein using special-purpose hardware.

At 2105, the base station may identify a downlink signal for scheduling for a UE. The operations of 2105 may be performed according to the methods described herein. In some examples, aspects of the operations of 2105 may be performed by a scheduling manager as described with reference to FIGS. 13 through 16.

At 2110, the base station may determine a transmission scheme of a set of transmission schemes for the downlink signal based on a first carrier of a downlink control message that schedules the downlink signal, a second carrier for transmission of the downlink signal, and a second TRP used for transmission of the downlink signal. The operations of 2110 may be performed according to the methods described herein. In some examples, aspects of the operations of 2110 may be performed by a scheme component as described with reference to FIGS. 13 through 16.

At 2115, the base station may determine a delay between the downlink control message and the downlink signal based on the transmission scheme. The operations of 2115 may be performed according to the methods described herein. In some examples, aspects of the operations of 2115 may be performed by a delay component as described with reference to FIGS. 13 through 16.

At 2120, the base station may transmit, to a UE and via the first carrier, the downlink control message that schedules the downlink signal on the second carrier for the UE according to the determined delay. The operations of 2120 may be performed according to the methods described herein. In some examples, aspects of the operations of 2120 may be performed by a control transmitter as described with reference to FIGS. 13 through 16.

Figure 22:
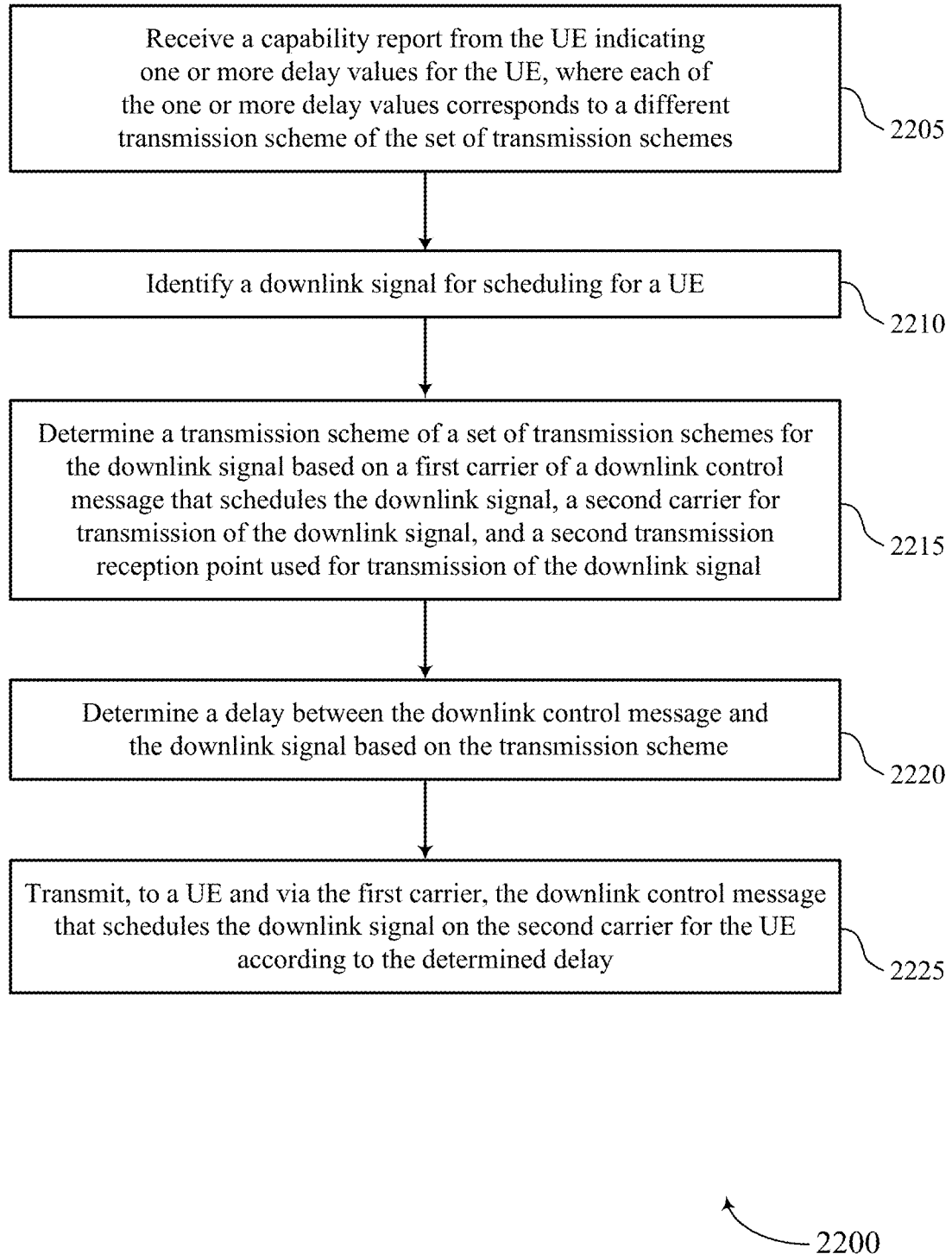

FIG. 22 shows a flowchart illustrating a method 2200 that supports timing for cross scheduling and reference signal triggering in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described herein. Additionally, or alternatively, a base station may perform aspects of the functions described herein using special-purpose hardware.

At 2205, the base station may receive a capability report from the UE indicating one or more delay values for the UE, where each of the one or more delay values corresponds to a different transmission scheme of the set of transmission schemes. The operations of 2205 may be performed according to the methods described herein. In some examples, aspects of the operations of 2205 may be performed by a capability receiver as described with reference to FIGS. 13 through 16.

At 2210, the base station may identify a downlink signal for scheduling for a UE. The operations of 2210 may be performed according to the methods described herein. In some examples, aspects of the operations of 2210 may be performed by a scheduling manager as described with reference to FIGS. 13 through 16.

At 2215, the base station may determine a transmission scheme of a set of transmission schemes for the downlink signal based on a first carrier of a downlink control message that schedules the downlink signal, a second carrier for transmission of the downlink signal, and a second TRP used for transmission of the downlink signal. The operations of 2215 may be performed according to the methods described herein. In some examples, aspects of the operations of 2215 may be performed by a scheme component as described with reference to FIGS. 13 through 16.

At 2220, the base station may determine a delay between the downlink control message and the downlink signal based on the transmission scheme. The operations of 2220 may be performed according to the methods described herein. In some examples, aspects of the operations of 2220 may be performed by a delay component as described with reference to FIGS. 13 through 16.

At 2225, the base station may transmit, to a UE and via the first carrier, the downlink control message that schedules the downlink signal on the second carrier for the UE according to the determined delay. The operations of 2225 may be performed according to the methods described herein. In some examples, aspects of the operations of 2225 may be performed by a control transmitter as described with reference to FIGS. 13 through 16.

Figure 23:
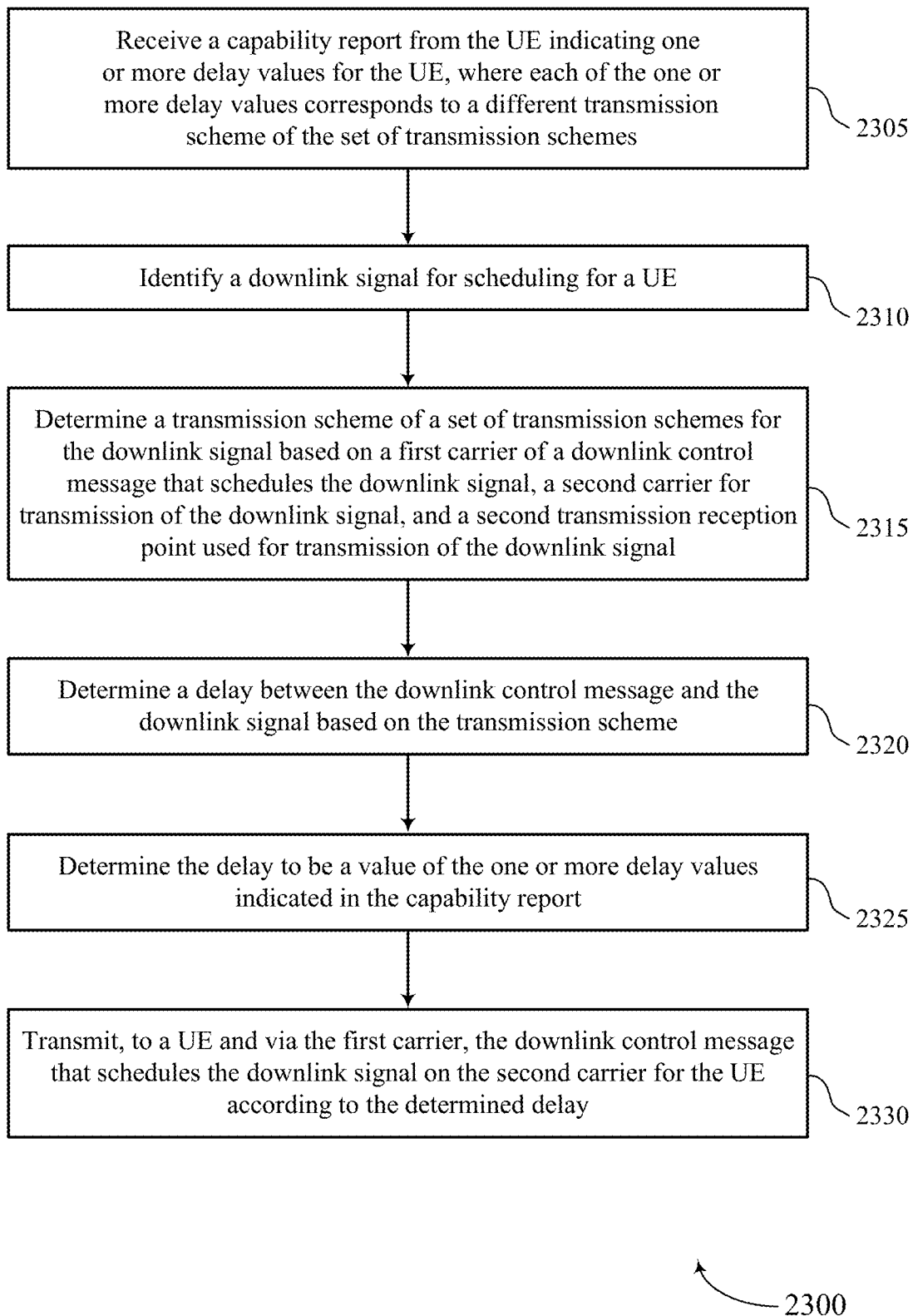

FIG. 23 shows a flowchart illustrating a method 2300 that supports timing for cross scheduling and reference signal triggering in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described herein. Additionally, or alternatively, a base station may perform aspects of the functions described herein using special-purpose hardware.

At 2305, the base station may receive a capability report from the UE indicating one or more delay values for the UE, where each of the one or more delay values corresponds to a different transmission scheme of the set of transmission schemes. The operations of 2305 may be performed according to the methods described herein. In some examples, aspects of the operations of 2305 may be performed by a capability receiver as described with reference to FIGS. 13 through 16.

At 2310, the base station may identify a downlink signal for scheduling for a UE. The operations of 2310 may be performed according to the methods described herein. In some examples, aspects of the operations of 2310 may be performed by a scheduling manager as described with reference to FIGS. 13 through 16.

At 2315, the base station may determine a transmission scheme of a set of transmission schemes for the downlink signal based on a first carrier of a downlink control message that schedules the downlink signal, a second carrier for transmission of the downlink signal, and a second TRP used for transmission of the downlink signal. The operations of 2315 may be performed according to the methods described herein. In some examples, aspects of the operations of 2315 may be performed by a scheme component as described with reference to FIGS. 13 through 16.

At 2320, the base station may determine a delay between the downlink control message and the downlink signal based on the transmission scheme. The operations of 2320 may be performed according to the methods described herein. In some examples, aspects of the operations of 2320 may be performed by a delay component as described with reference to FIGS. 13 through 16.

At 2325, the base station may determine the delay to be a value of the one or more delay values indicated in the capability report. The operations of 2325 may be performed according to the methods described herein. In some examples, aspects of the operations of 2325 may be performed by a delay component as described with reference to FIGS. 13 through 16.

At 2330, the base station may transmit, to a UE and via the first carrier, the downlink control message that schedules the downlink signal on the second carrier for the UE according to the determined delay. The operations of 2330 may be performed according to the methods described herein. In some examples, aspects of the operations of 2330 may be performed by a control transmitter as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for wireless communications at a user equipment (UE), comprising:
receiving, from a first transmission reception point and via a first carrier configured for the UE, a downlink control message that schedules a downlink signal on a second carrier for the UE;
determining a transmission scheme of a plurality of transmission schemes based at least on the first carrier, the second carrier, and a second transmission reception point scheduled for transmission of the downlink signal;
determining a delay between the downlink control message and the downlink signal based at least on the transmission scheme; and receiving the downlink signal via the second carrier in accordance with the determined delay, wherein determining the delay comprises:
(i) determining a first value for the delay based at least on the first and second transmission reception points being the same, and determining a second value for the delay based at least on the first and second transmission reception points being different, wherein the transmission scheme is a multiple transmission reception point scheme associated with the first transmission reception point and the second transmission reception point, the method further comprising determining the second value based at least on a multiplexing scheme associated with the multiple transmission reception point scheme; or
(ii) determining the first value for the delay based at least on the first and second carriers being the same, determining the second value for the delay based at least on the first and second carriers being different, determining a third value for the delay based at least on the first and second transmission reception points being the same, and determining a fourth value for the delay based at least on the first and second transmission reception points being different; or
(iii) determining the delay to be a value of one or more delay values indicated in a capability report, the method further comprising transmitting the capability report to the first transmission reception point indicating the one or more delay values for the UE, wherein each of the one or more delay values corresponds to a different transmission scheme of the plurality of transmission schemes.

2. The method of claim 1, wherein the determining the delay comprises:
the determining the first value for the delay based at least on the first and second transmission reception points being the same; and
the determining the second value for the delay based at least on the first and second transmission reception points being different,
wherein the transmission scheme is the multiple transmission reception point scheme associated with the first transmission reception point and the second transmission reception point, the method further comprising:
the determining the second value based at least on a multiplexing scheme associated with the multiple transmission reception point scheme.

3. The method of claim 1, wherein the determining the delay comprises:
the determining the first value for the delay based at least on the first and second carriers being the same;
the determining the second value for the delay based at least on the first and second carriers being different;
the determining the third value for the delay based at least on the first and second transmission reception points being the same; and
the determining the fourth value for the delay based at least on the first and second transmission reception points being different.

4. The method of claim 1, wherein the determining the delay comprises:
the determining the delay to be the value of the one or more delay values indicated in the capability report, wherein the method comprises the transmitting the capability report to the first transmission reception point indicating the one or more delay values for the UE, wherein each of the one or more delay values corresponds to the different transmission scheme of the plurality of transmission schemes.

5. The method of claim 4, wherein the receiving the downlink control message comprises:
receiving an indication of the value of the one or more delay values in the downlink control message.

6. The method of claim 1, wherein the delay comprises a scheduling delay or a beam switching timing and corresponds to a number of symbols between an end symbol of the downlink control message and a start symbol of the downlink signal.

7. A method for wireless communications at a first transmission reception point, comprising:
identifying a downlink signal for scheduling for a user equipment (UE);
determining a transmission scheme of a plurality of transmission schemes for the downlink signal based at least on a first carrier of a downlink control message that schedules the downlink signal, a second carrier for transmission of the downlink signal, and a second transmission reception point used for transmission of the downlink signal;
determining a delay between the downlink control message and the downlink signal based at least on the transmission scheme; and
transmitting, to a UE and via the first carrier, the downlink control message that schedules the downlink signal on the second carrier for the UE according to the determined delay,
wherein determining the delay comprises:
(i) determining a first value for the delay based at least on the first and second transmission reception points being the same, determining a second value for the delay based at least on the first and second transmission reception points being different, wherein the transmission scheme is a multiple transmission reception point scheme associated with the first transmission reception point and the second transmission reception point, and determining the second value based at least on a multiplexing scheme associated with the multiple transmission reception point scheme; or
(ii) determining the first value for the delay based at least on the first and second carriers being the same, determining the second value for the delay based at least on the first and second carriers being different, determining a third value for the delay based at least on the first and second transmission reception points being the same, and determining a fourth value for the delay based at least on the first and second transmission reception points being different; or
(iii) determining the delay to be a value of one or more delay values indicated in a capability report, the method further comprising transmitting the capability report to the first transmission reception point indicating the one or more delay values for the UE, wherein each of the one or more delay values corresponds to a different transmission scheme of the plurality of transmission schemes.

8. The method of claim 7, wherein the determining the delay comprises:
the determining the first value for the delay based at least on the first and second transmission reception points being the same;
the determining the second value for the delay based at least on the first and second transmission reception points being different, wherein the transmission scheme is the multiple transmission reception point scheme associated with the first transmission reception point and the second transmission reception point;
the determining the second value based at least on a multiplexing scheme associated with the multiple transmission reception point scheme.

9. The method of claim 7, wherein the determining the delay comprises:
the determining the first value for the delay based at least on the first and second carriers being the same;
the determining the second value for the delay based at least on the first and second carriers being different;
the determining the third value for the delay based at least on the first and second transmission reception points being the same; and
the determining the fourth value for the delay based at least on the first and second transmission reception points being different.

10. The method of claim 7, wherein the determining the delay comprises:
the determining the delay to be the value of the one or more delay values indicated in the capability report, wherein the method comprises the receiving the capability report from the UE indicating the one or more delay values for the UE, wherein each of the one or more delay values corresponds to the different transmission scheme of the plurality of transmission schemes.

11. The method of claim 10, wherein the transmitting the downlink control message comprises:
transmitting an indication of the value of the one or more delay values in the downlink control message.

12. The method of claim 7, wherein the delay comprises a scheduling delay or a beam switching timing and corresponds to a number of symbols between an end symbol of the downlink control message and a start symbol of the downlink signal.

13. A user equipment (UE) for wireless communications, comprising:
one or more processors;
memory coupled to the one or more processors; and
instructions stored in the memory and executable by the one or more processors to cause the UE to:
receive, from a first transmission reception point and via a first carrier configured for the UE, a downlink control message that schedules a downlink signal on a second carrier for the UE;
determine a transmission scheme of a plurality of transmission schemes based at least on the first carrier, the second carrier, and a second transmission reception point scheduled for transmission of the downlink signal;
determine a delay between the downlink control message and the downlink signal based at least on the transmission scheme; and
receive the downlink signal via the second carrier in accordance with the determined delay,
wherein to determine the delay, the instructions stored in the memory are executable by the one or more processors to cause the UE to:
(i) determine a first value for the delay based at least on the first and second transmission reception points being the same, and determine a second value for the delay based at least on the first and second transmission reception points being different, wherein the transmission scheme is a multiple transmission reception point scheme associated with the first transmission reception point and the second transmission reception point, and determine the second value based at least on a multiplexing scheme associated with the multiple transmission reception point scheme; or
(ii) determine the first value for the delay based at least on the first and second carriers being the same, determine the second value for the delay based at least on the first and second carriers being different, determine a third value for the delay based at least on the first and second transmission reception points being the same, and determine a fourth value for the delay based at least on the first and second transmission reception points being different; or
(iii) determine the delay to be a value of one or more delay values indicated in a capability report, wherein the instructions stored in the memory are executable by the one or more processors to cause the UE to transmit the capability report to the first transmission reception point indicating the one or more delay values for the UE, wherein each of the one or more delay values corresponds to a different transmission scheme of the plurality of transmission schemes.

14. The UE of claim 13, wherein to determine the delay, the instructions stored in the memory are executable by the one or more processors to cause the UE to:
determine the first value for the delay based at least on the first and second transmission reception points being the same; and
determine the second value for the delay based at least on the first and second transmission reception points being different,
wherein the transmission scheme is the multiple transmission reception point scheme associated with the first transmission reception point and the second transmission reception point, and
determine the second value based at least on a multiplexing scheme associated with the multiple transmission reception point scheme.

15. The UE of claim 13, wherein to determine the delay, the instructions stored in the memory are executable by the one or more processors to cause the UE to:
determine the first value for the delay based at least on the first and second carriers being the same;
determine the second value for the delay based at least on the first and second carriers being different;
determine the third value for the delay based at least on the first and second transmission reception points being the same; and
determine the fourth value for the delay based at least on the first and second transmission reception points being different.

16. The UE of claim 13, wherein to determine the delay, the instructions stored in the memory are executable by the one or more processors to cause the UE to:
the determining the delay to be the value of the one or more delay values indicated in the capability report, wherein the method comprises the transmitting the capability report to the first transmission reception point indicating the one or more delay values for the UE, wherein each of the one or more delay values corresponds to the different transmission scheme of the plurality of transmission schemes.

17. The UE of claim 16, wherein to receive the downlink control message, the instructions stored in the memory are executable by the one or more processors to cause the UE to:

receive an indication of the value of the one or more delay values in the downlink control message.

18. The UE of claim 13, wherein the delay comprises a scheduling delay or a beam switching timing and corresponds to a number of symbols between an end symbol of the downlink control message and a start symbol of the downlink signal.

19. A first transmission reception point for wireless communications, comprising:
one or more processors;
memory coupled to the one or more processors; and
instructions stored in the memory and executable by the one or more processors to cause the first transmission reception point to:
identify a downlink signal for scheduling for a user equipment (UE);
determine a transmission scheme of a plurality of transmission schemes for the downlink signal based at least on a first carrier of a downlink control message that schedules the downlink signal, a second carrier for transmission of the downlink signal, and a second transmission reception point used for transmission of the downlink signal;
determine a delay between the downlink control message and the downlink signal based at least on the transmission scheme; and
transmit, to a UE and via the first carrier, the downlink control message that schedules the downlink signal on the second carrier for the UE according to the determined delay,
wherein to determine the delay, the instructions stored in the memory are executable by the one or more processors to cause the first transmission reception point to:
(i) determine a first value for the delay based at least on the first and second transmission reception points being the same, determine a second value for the delay based at least on the first and second transmission reception points being different, wherein the transmission scheme is a multiple transmission reception point scheme associated with the first transmission reception point and the second transmission reception point, and determine the second value based at least on a multiplexing scheme associated with the multiple transmission reception point scheme; or
(ii) determine the first value for the delay based at least on the first and second carriers being the same, determine the second value for the delay based at least on the first and second carriers being different, determine a third value for the delay based at least on the first and second transmission reception points being the same, and determine a fourth value for the delay based at least on the first and second transmission reception points being different; or
(iii) determine the delay to be a value of one or more delay values indicated in a capability report, wherein the instructions stored in the memory are executable by the one or more processors to cause the first transmission reception point to transmit the capability report to the first transmission reception point indicating the one or more delay values for the UE, wherein each of the one or more delay values corresponds to a different transmission scheme of the plurality of transmission schemes.

20. The first transmission reception point of claim 19, wherein to determine the delay, the instructions stored in the memory are executable by the one or more processors to cause the first transmission reception point to:
determine the first value for the delay based at least on the first and second transmission reception points being the same;
determine the second value for the delay based at least on the first and second transmission reception points being different,
wherein the transmission scheme is the multiple transmission reception point scheme associated with the first transmission reception point and the second transmission reception point;
determine the second value based at least on a multiplexing scheme associated with the multiple transmission reception point scheme.

21. The first transmission reception point of claim 19, wherein to determine the delay, the instructions stored in the memory are executable by the one or more processors to cause the first transmission reception point to:
determine the first value for the delay based at least on the first and second carriers being the same;
determine the second value for the delay based at least on the first and second carriers being different;
determine the third value for the delay based at least on the first and second transmission reception points being the same; and
determine the fourth value for the delay based at least on the first and second transmission reception points being different.

22. The first transmission reception point of claim 19, wherein to determine the delay, the instructions stored in the memory are executable by the one or more processors to cause the first transmission reception point to:
determine the delay to be the value of the one or more delay values indicated in the capability report, wherein the method comprises the receiving the capability report from the UE indicating the one or more delay values for the UE, wherein each of the one or more delay values corresponds to the different transmission scheme of the plurality of transmission schemes.

23. The first transmission reception point of claim 22, wherein to transmit the downlink control message, the instructions stored in the memory are executable by the one or more processors to cause the first transmission reception point to:
transmit an indication of the value of the one or more delay values in the downlink control message.

24. The first transmission reception point of claim 19, wherein the delay comprises a scheduling delay or a beam switching timing and corresponds to a number of symbols between an end symbol of the downlink control message and a start symbol of the downlink signal.

* * * * *